US008868562B2

(12) United States Patent
Crouch et al.

(10) Patent No.: US 8,868,562 B2
(45) Date of Patent: Oct. 21, 2014

(54) IDENTIFICATION OF SEMANTIC RELATIONSHIPS WITHIN REPORTED SPEECH

(75) Inventors: Richard S. Crouch, Cupertino, CA (US); Martin Henk Van Den Berg, Palo Alto, CA (US); David Ahn, San Francisco, CA (US); Olga Gurevich, San Francisco, CA (US); Barney D. Pell, San Francisco, CA (US); Livia Polanyi, Palo Alto, CA (US); Scott A. Prevost, San Francisco, CA (US); Giovanni Lorenzo Thione, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 1073 days.

(21) Appl. No.: 12/201,675

(22) Filed: Aug. 29, 2008

(65) Prior Publication Data

US 2009/0063426 A1 Mar. 5, 2009

Related U.S. Application Data

(60) Provisional application No. 60/969,434, filed on Aug. 31, 2007, provisional application No. 60/969,478, filed on Aug. 31, 2007, provisional application No. 60/969,486, filed on Aug. 31, 2007, provisional application No. 60/969,442, filed on Aug. 31, 2007.

(51) Int. Cl.
*G06F 7/00* (2006.01)
*G06F 17/30* (2006.01)

(52) U.S. Cl.
CPC .... *G06F 17/30616* (2013.01); *G06F 17/30619* (2013.01); *G06F 17/30684* (2013.01)
USPC ............... 707/739; 707/741; 704/1; 704/9

(58) Field of Classification Search
CPC ............ G06F 17/2795; G06F 17/3061; G06F 17/30616; G06F 17/30622; G06F 17/30625; G06F 17/30675; G06F 17/30696; G06F 17/30864

USPC .................. 707/739, 741; 704/1, 9
See application file for complete search history.

(56) References Cited

U.S. PATENT DOCUMENTS 4,876,643 A 10/1989 McNeil et al.
5,519,608 A 5/1996 Kupiec
(Continued)

FOREIGN PATENT DOCUMENTS

CN 1606004 4/2005
CN 1658188 8/2005
(Continued)

OTHER PUBLICATIONS

U.S. Appl. No. 60/969,406, filed Aug. 31, 2007, Applying Term Occurrence Constraints in Natural Language Search.
(Continued)

*Primary Examiner* — Shew-Fen Lin
(74) *Attorney, Agent, or Firm* — Dave Ream; Peter Taylor; Micky Minhas

(57) ABSTRACT

Methods and computer-readable media for associating words or groups of words distilled from content, such as reported speech or an attitude report, of a document to form semantic relationships collectively used to generate a semantic representation of the content are provided. Semantic representations may include elements identified or parsed from a text portion of the content, the elements of which may be associated with other elements that share a semantic relationship, such as an agent, location, or topic relationship. Relationships may also be developed by associating one element that is in relation to, or is about, another element, thereby allowing for rapid and effective comparison of associations found in a semantic representation with associations derived from queries. The semantic relationships may be determined based on semantic information, such as potential meanings and grammatical functions of each element within the text portion of the content.

12 Claims, 11 Drawing Sheets

(56) References Cited

U.S. PATENT DOCUMENTS

| | | | |
|---|---|---|---|
| 5,530,939 | A | 6/1996 | Mansfield, Jr. et al. |
| 5,696,962 | A | 12/1997 | Kupiec |
| 5,933,822 | A * | 8/1999 | Braden-Harder et al. ............ 1/1 |
| 6,076,051 | A | 6/2000 | Messerly |
| 6,161,084 | A | 12/2000 | Messerly |
| 6,189,002 | B1 | 2/2001 | Roitblat |
| 6,243,670 | B1 | 6/2001 | Bessho |
| 6,246,977 | B1 | 6/2001 | Messerly et al. |
| 6,269,368 | B1 | 7/2001 | Diamond |
| 6,366,908 | B1 | 4/2002 | Chong et al. |
| 6,374,209 | B1 | 4/2002 | Yoshimi et al. |
| 6,654,740 | B2 | 11/2003 | Tokuda et al. |
| 6,675,159 | B1 | 1/2004 | Klein et al. |
| 6,678,677 | B2 | 1/2004 | Roux |
| 6,678,686 | B1 | 1/2004 | Patel et al. |
| 6,741,981 | B2 | 5/2004 | McGreevy |
| 6,766,316 | B2 | 7/2004 | Caudill et al. |
| 6,823,301 | B1 | 11/2004 | Ishikura |
| 6,842,730 | B1 | 1/2005 | Ejerhed |
| 6,871,199 | B1 | 3/2005 | Binning et al. |
| 6,901,399 | B1 | 5/2005 | Corston |
| 6,947,923 | B2 | 9/2005 | Cha et al. |
| 6,968,332 | B1 | 11/2005 | Milic-Frayling |
| 7,016,828 | B1 | 3/2006 | Coyne et al. |
| 7,027,974 | B1 | 4/2006 | Busch et al. |
| 7,031,910 | B2 | 4/2006 | Eisele |
| 7,035,789 | B2 | 4/2006 | Abrego et al. |
| 7,120,574 | B2 | 10/2006 | Troyanova et al. |
| 7,171,349 | B1 * | 1/2007 | Wakefield et al. ................ 704/9 |
| 7,184,950 | B2 | 2/2007 | Weise |
| 7,194,406 | B2 | 3/2007 | Ejerhed et al. |
| 7,225,121 | B2 | 5/2007 | Maxwell et al. |
| 7,269,594 | B2 | 9/2007 | Corston-Oliver |
| 7,319,951 | B2 | 1/2008 | Rising et al. |
| 7,346,490 | B2 | 3/2008 | Fass |
| 7,398,201 | B2 * | 7/2008 | Marchisio et al. ................ 704/9 |
| 7,401,077 | B2 | 7/2008 | Bobrow et al. |
| 2002/0091684 | A1 | 7/2002 | Nomiyama et al. |
| 2002/0188586 | A1 | 12/2002 | Veale |
| 2003/0233224 | A1 | 12/2003 | Marchisio et al. |
| 2004/0103090 | A1 | 5/2004 | Dogl et al. |
| 2004/0243554 | A1 * | 12/2004 | Broder et al. .................... 707/3 |
| 2004/0243556 | A1 * | 12/2004 | Ferrucci et al. .................. 707/3 |
| 2004/0249795 | A1 | 12/2004 | Brockway |
| 2005/0043936 | A1 * | 2/2005 | Corston-Oliver et al. ........ 704/4 |
| 2005/0065777 | A1 * | 3/2005 | Dolan et al. .................... 704/10 |
| 2005/0071150 | A1 * | 3/2005 | Nasypny ........................... 704/9 |
| 2005/0108001 | A1 | 5/2005 | Aarskog |
| 2005/0108630 | A1 * | 5/2005 | Wasson et al. ................ 715/513 |
| 2005/0182619 | A1 | 8/2005 | Azara |
| 2005/0267871 | A1 | 12/2005 | Marchisio et al. |
| 2005/0283474 | A1 | 12/2005 | Francis et al. |
| 2006/0047632 | A1 | 3/2006 | Zhang |
| 2006/0156222 | A1 | 7/2006 | Chi |
| 2006/0161534 | A1 | 7/2006 | Carson et al. |
| 2006/0184517 | A1 | 8/2006 | Anderson et al. |
| 2006/0224582 | A1 | 10/2006 | Hogue |
| 2006/0271353 | A1 | 11/2006 | Berkan et al. |
| 2007/0073533 | A1 * | 3/2007 | Thione et al. ..................... 704/9 |
| 2007/0073745 | A1 | 3/2007 | Scott |
| 2007/0143098 | A1 | 6/2007 | Van Der Berg |
| 2007/0156393 | A1 | 7/2007 | Todhunter et al. |
| 2008/0033982 | A1 | 2/2008 | Parikh |
| 2008/0086498 | A1 | 4/2008 | Sureka |
| 2008/0120279 | A1 | 5/2008 | Xue |
| 2008/0172628 | A1 | 7/2008 | Mehrotra et al. |
| 2009/0019038 | A1 | 1/2009 | Millett |
| 2009/0271179 | A1 | 10/2009 | Marchisio et al. |
| 2010/0106706 | A1 | 4/2010 | Rorex |

FOREIGN PATENT DOCUMENTS

| | | |
|---|---|---|
| EP | 0597630 | 5/1994 |
| KR | 1005046743 | 4/2005 |
| WO | 02067145 | 8/2002 |

OTHER PUBLICATIONS

U.S. Appl. No. 60/969,442, filed Aug. 31, 2007, Valence Calculus for Indexing with Special Reference to Reported Speech and Thought.
U.S. Appl. No. 60/969,447, filed Aug. 31, 2007, Bucketized Threshold for Runtime Ranking and Pruning of Senses.
U.S. Appl. No. 60/969,451, filed Aug. 31, 2007, Hierarchal Probability-Based Weighting for Hypernyms in Word Sense Disambiguation.
U.S. Appl. No. 60/969,417, filed Aug. 31, 2007, Checkpointing of Composable Lazily-Evaluated Iterators in Search.
U.S. Appl. No. 60/969,472, filed Aug. 31, 2007, Semi-Automatic Example-Based Induction of Semantic Translation Rules to Support Natural Language Search.
U.S. Appl. No. 60/969,426, filed Aug. 31, 2007, Indexing of Alias Clusters for Search.
U.S. Appl. No. 60/969,495, filed Aug. 31, 2007, Efficient Posting Layout for Retrieval of Terms in Dominance Hierarchies.
U.S. Appl. No. 60/969,434, filed Aug. 31, 2007, Aboutness Identification and Indexing.
U.S. Appl. No. 60/969,478, filed Aug. 31, 2007, Semantically-based Highlighting of Search Results.
U.S. Appl. No. 60/969,486, filed Aug. 31, 2007, Fact-based Indexing for Natural Language Search.
U.S. Appl. No. 60/969,490, filed Aug. 31, 2007, Indexing and Ranking Role Hierarchies Search Index.
U.S. Appl. No. 60/971,061, filed Sep. 10, 2007, A System for Browsing Knowledge on the Basis of Semantic Relations.
U.S. Appl. No. 60/969,483, filed Aug. 31, 2007, Integration of Coreference Resolution in an Ambiguity-Sensitive Natural Language Processing Pipeline for a Search Platform.
Final Office Action, mailed Jun. 22, 2011 in U.S. Appl. No. 12/201,596, 23 pages.
Final Office Action, mailed Jun. 7, 2011 in U.S. Appl. No. 12/201,978 23 pages.
Office Action, mailed Mar. 17, 2011 in U.S. Appl. No. 12/201,504, 18 pages.
Vintar, et al, "Semantic Relations in Concept-Based Cross-Language Medical Information Retrieval, " University of Sheffield, Dept. of Computer Science, United Kingdom, 2008, 9 pp.
International Search Report and Written Opinion of the ISA, mailed Mar. 31, 2009, 12 pp., re International Appl. No. PCT/US2008/074938, Intl. Filing Date Aug. 29, 2008.
International Search Report and Written Opinion of the ISA, mailed Mar. 31, 2009, 12 pp., re International Appl. No. PCT/US2008/074984, Intl. Filing Date Sep. 2, 2008.
International Search Report and Written Opinion of the ISA, mailed Mar. 31, 2009, 12 pp., re International Appl. No. PCT/US2008/074987, Intl. Filing Date Sep. 2, 2008.
International Search Report and Written Opinion of the ISA, mailed Apr. 29, 2009, 11 pp., re International Appl. No. PCT/US2008/074981, Intl. Filing Date Sep. 2, 2008.
Jun et al., "Keyfact-Based Information Retrieval System," Apr. 15, 2011, 6 pp., System Software Department, Electronics and Telecommunications research institute, TaeJon, Korea.
Non-Final Office Action, mailed Mar. 15, 2011, re U.S. Appl. No. 12/201,721, filed Aug. 29, 2008 (12 pgs).
Sieg et al., "Learning Ontology-based User Profiles: A Semantic Approach to Personalized Web Search," Nov. 2007, 12 pp., IEEE Intelligent informatics Bulletin, vol. 8, No. 1.
Dong-IL Han_et_al, "A Study on the Conceptual Modeling and Implementation of a Semantic Search System", Korea Intelligent Information Systems Society, Mar. 2008, vol. 14, No. 1, pp. 67-84.
Manegold et al., "A multi-query optimizer for Monet," Jan. 31, 2000, 18 pp., Report INS-R0002, ISSN 1386-3681, Amsterdam, The Netherlands.
Non-Final Office Action, mailed Dec. 23, 2010, U.S. Appl. No. 12/201,978, filed Aug. 29, 2008 (12 pgs).

(56) References Cited

OTHER PUBLICATIONS

Final Office Action mailed Oct. 12, 2011 re U.S. Appl. No. 12/201,504, 21 pages.
Non-Final Office Action mailed Oct. 26, 2011 re U.S. Appl. No. 12/201,721, 14 pages.
European Search Report dated Sep. 23, 2011 in Application No. 08799054.5-2201/2185999, 7 pages.
Notice of China PCT First Office Action mailed Oct. 18, 2011 re App. No. 200880105617.2.
Non Final Office Action in U.S. Appl. No. 12/201,978 mailed Jan. 4, 2012, 21 pages.
Notice of Allowance and Fees Due in U.S. Appl. No. 12/201,503 mailed Apr. 5, 2012, 25 pages.
Smeaton et al., "Experiments on Using Semantic Distances between Words in Images Caption Retrieval," School of Computer Applications, Working Paper: CA-0196, Dublin City University, Dublin, Ireland, 2008, 8 pp.
Lo et al., "Using Semantic Relations with World Knowledge for Question Answering," Dept. of Systems Engineering and Engineering Management, The Chinese University of Hong Kong, Hong Kong, 2008, 6 pp.
"Hakia—Meaning-based Search Engine for a Better Search," 2008, 8 pp., http://www.techiequest.com/hakia-meaning-based-search-engine-for-a-better-search/.
Yohei Seki, "Answer Extraction System by Question Type from Query Biased Summary for Newspaper Articles," 8 pp., 2003 National Institute of Informatics, Proceedings of the Third NTCIR Workshop, Sep. 2001-Oct. 2002, Tokyo, Japan, http://research.nii.ac.jp/ntcir/workshop/OnlineProceedings3/NTCIR3-QAC-SekiY.pdf.
Non-Final Office Action, mailed Jan. 3, 2011, U.S. Appl. No. 12/201,596, filed Aug. 29, 2008, 19 pp.
Hussam et al., "Semantic Highlighting on the WWW: Educational Implications," published Nov. 1998, 7 pp., World Conference of the WWW, Internet and Intranet Proceedings (3rd Orlando, FL, Nov. 7-12).
"Inside Microsoft: Semantic Search Methods," Aug. 28, 2008, 14 pp., http://www.microsoft.apres.com/asptodayarchive/73985/semantic-search-methods.
Taibi et al., "A Semantic Search Engine for Learning Resources," 2005 Formatex, 5 pp., Recent Research Developments in Learning technologies (2005), http://www.formatex.org/micte2005/349.pdf.
Srihari et al., "Information Extraction Supported Question Answering," Oct. 15, 1999, 12 pp., Williamsville, NY, http://trec.nist.gov/pubs/trec8/papers/cymfony.pdf.
Nishant Kapoor et al., "STAR: A System for Tuple and Attribute Ranking of Query Answer," in: International Conference on Data Engineering, 2007, Apr. 15, 2007.
Agichtein et al., "Snowball Extracting Relations from Large Plain-Text Collections," Columbia University Computer Science Dept. Technical Report CUCS-033-99, Dec. 1999, 13 pp.
Notice of Allowance and Fees Due in U.S. Appl. No. 12/201,721, mailed May 14, 2012, 52 pages.
Final Office Action in U.S. Appl. No. 12/201,978, mailed Aug. 8, 2012, 31 pages.

* cited by examiner

IDENTIFICATION OF SEMANTIC RELATIONSHIPS WITHIN REPORTED SPEECH

This application claims the benefit of the following U.S. Provisional Applications having the respectively listed Application numbers and filing dates, and each of which is expressly incorporated by reference herein: U.S. Provisional Application No. 60/969434, filed Aug. 31, 2007, U.S. Provisional Application No. 60/969478, filed Aug. 31, 2007, U.S. Provisional Application No. 60/969486, filed Aug. 31, 2007, and U.S. Provisional Application No. 60/969442, filed Aug. 31, 2007.

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Online search engines have become an increasingly important tool for conducting research or navigating documents accessible via the Internet. Often, the online search engines perform a matching process for detecting possible documents, or text within those documents, that utilizes a query submitted by a user. Initially, the matching process, offered by conventional online search engines such as those maintained by Google or Yahoo, allow the user to specify one or more keywords in the query to describe information that s/he is looking for. Next, the conventional online search engine proceeds to find all documents that contain exact matches of the keywords, although these documents typically do not provide relevant or meaningful results in response to the query.

Present conventional online search engines are limited in that they do not recognize words in the searched documents corresponding to keywords in the query beyond the exact matches produced by the matching process. Also, conventional online search engines are limited because a user is restricted to keywords in a query that are to be matched, and thus, do not allow the user to precisely express the information desired, if unknown. Accordingly, implementing a natural language search engine to recognize semantic relationships between keywords of a query and words in searched documents would uniquely increase the accuracy of the search results.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to computer-implemented methods and computer-readable media for developing associations between various words found in content of documents retrieved from the web or some other repository, as well as query search terms. Content that may be semantically represented may be reported speech and other attitude reports, so that the semantic representation of the content may be compared against received natural language queries to provide a user with meaningful and highly relevant results. Semantic relationships, such as "about" relationships, may be identified between certain elements or search terms to allow for specific word associations to be formed. Once semantic relationships are formed, a semantic representation may be generated for content in a document, and a proposition may be generated for a search query, both of which allow for rapid comparison of the proposition to one or more semantic relationships to determine the most relevant search results.

BRIEF DESCRIPTION OF THE DRAWINGS

Embodiments of the present invention are described in detail below with reference to the attached drawing figures, wherein.

DETAILED DESCRIPTION

Figure 1:
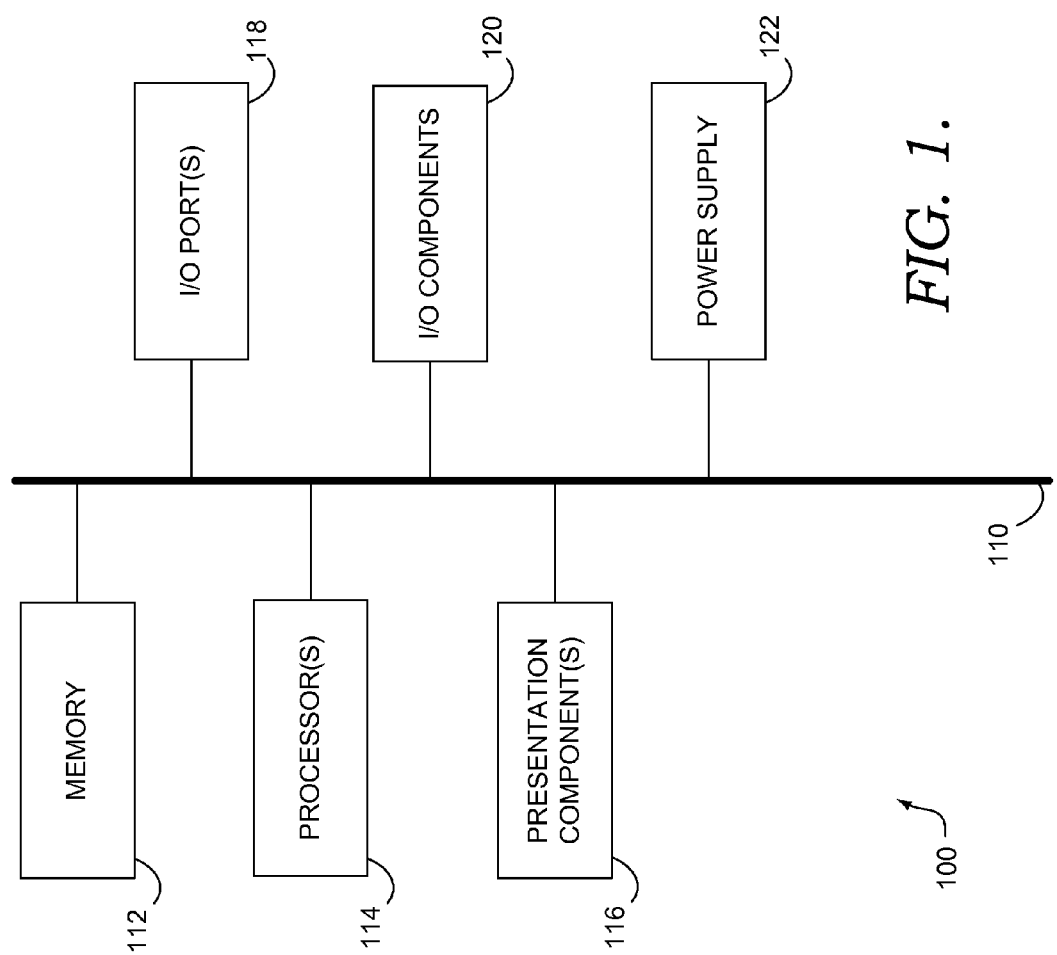
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Accordingly, in one aspect, a computer-implemented method for developing semantic relationships between elements distilled from content of a document to generate a semantic representation of the content for indexing is provided. Initially, the method includes identifying a text portion of the document to be indexed and determining semantic information for a plurality of elements identified in the text portion. The semantic information may include one or both of the meanings of the identified elements or grammatical and/or semantic relations between the identified elements. At least one of the identified elements may be identified as a reporting act corresponding to a speech report or an attitude report. The method further includes associating the identified elements so that each association of identified elements represents a certain semantic relationship based on the determined semantic information of the identified elements. Additionally, the method includes generating a semantic representation that includes the associations of the identified elements.

In another aspect, a computer-implemented method is provided for, in response to receiving a natural language query, creating associations between various terms distilled from the query to generate a proposition. The proposition may be used to interrogate semantic representations of content from documents stored in a semantic index to provide relevant search results. The method also includes determining associated semantic information for one or more search terms found within the query. A first reporting act may be determined within the query, and a semantic relationship may be formed between the first reporting act and at least one of the search terms based on the determined semantic information for that search term. The created association between the first reporting act and the search term is made by way of a relational element that describes the semantic relationship. Lastly, a proposition that includes the formed associations may be generated and may be further compared to semantic representations to determine highly relevant search results.

In yet another aspect, one or more computer-readable media having computer-useable instructions embodied thereon for performing a method of developing semantic relationships between elements distilled from content of a document to generate a semantic representation of the content to be indexed is provided. Initially, the method includes identifying at least a portion of the document, or a text portion, to be indexed. The text portion may then be parsed to identify elements that are to be semantically represented. Potential meanings and grammatical or semantic relations between the identified elements are determined, in addition to determining one or more levels of association within the text portion. The method also includes identifying a reporting act within the text portion for each of the one or more determined levels of association so that the first reporting act may be associated with a first set of identified elements. The first reporting act may be associated with a first level of association. Similarly, a second reporting act may be associated with a second set of identified elements, the second reporting act being associated with a second level of association. Further, a semantic representation may be generated that includes associations by way of a relational element that describes the associations between the first set of identified elements to the first reporting act and the second set of identified elements to the second reporting act.

Having briefly described an overview of embodiments of the present invention and some of the features therein, an exemplary operating environment suitable for implementing the present invention is described below.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks or implements particular abstract data types. Embodiments of the present invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O ) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear and, metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated to be within the scope of FIG. 1 in reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVDs) or other optical or holographic media; magnetic cassettes, magnetic tape, magnetic disk storage or other magnetic storage devices; or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
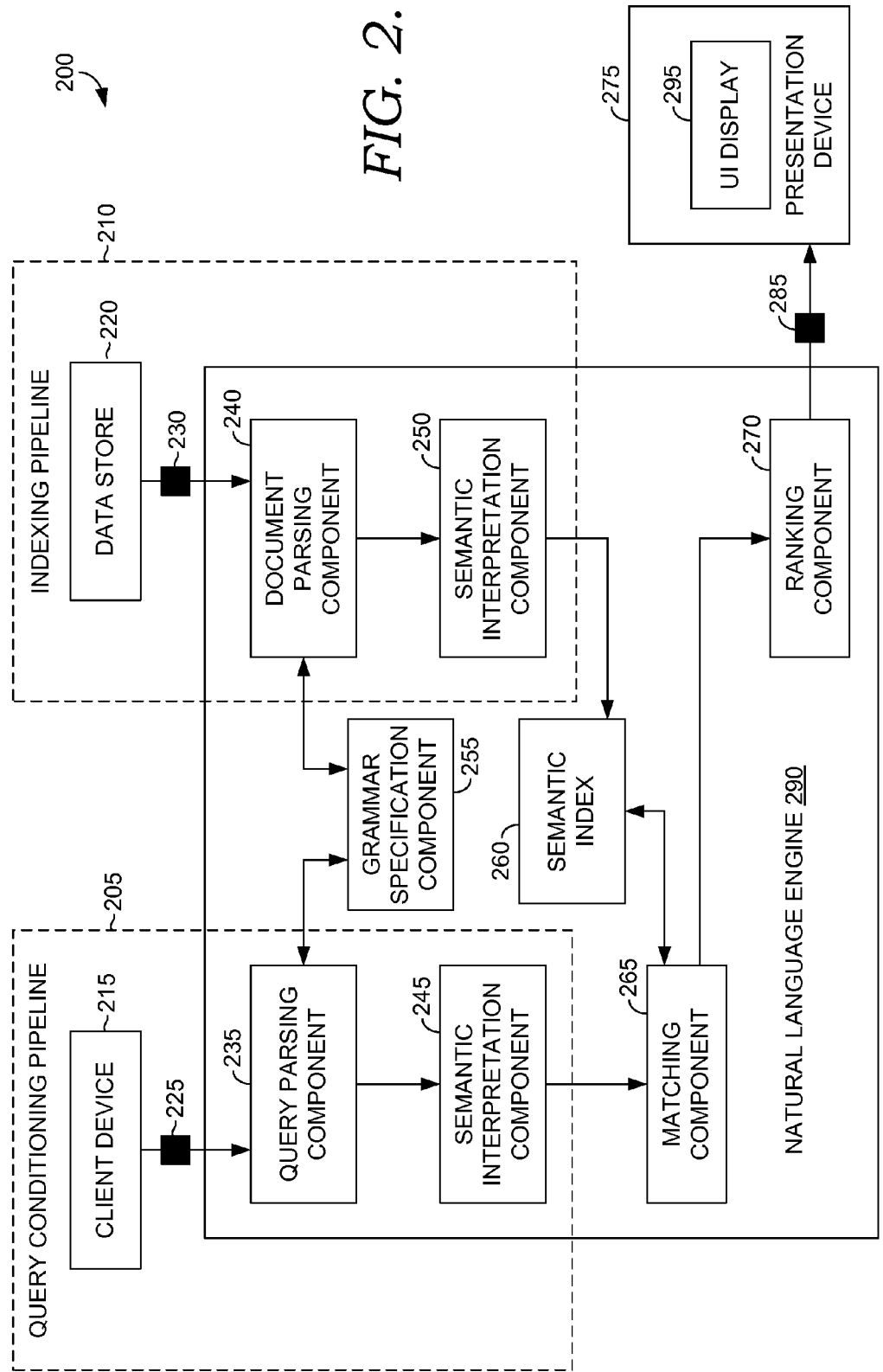
FIG. 2 is a schematic diagram of an exemplary system architecture suitable for use in implementing embodiments of the present invention.

Turning now to FIG. 2, a schematic diagram of an exemplary system architecture 200 suitable for use in implementing embodiments of the present invention is shown, in accordance with an embodiment of the present invention. It will be understood and appreciated by those of ordinary skill in the art that the exemplary system architecture 200 shown in FIG. 2 is merely an example of one suitable computing environment and is not intended to suggest any limitation as to the scope of use or functionality of the present invention. Neither should the exemplary system architecture 200 be interpreted as having any dependency or requirement related to any single component or combination of components illustrated therein.

As illustrated, the system architecture 200 may include a distributed computing environment, where a client device 215 is operably coupled to a natural language engine 290, which, in turn, is operably coupled to a data store 220. In embodiments of the present invention that are practiced in the distributed computing environments, the operable coupling refers to linking the client device 215 and the data store 220 to the natural language engine 290, and other online components through appropriate connections. These connections may be wired or wireless. Examples of particular wired embodiments, within the scope of the present invention, include USB connections and cable connections over a network (not shown), or a bus or other channel that interconnects components within a single machine. Examples of particular wireless embodiments, within the scope of the present invention, include a near-range wireless network and radio-frequency technology.

It should be understood and appreciated that the designation of "near-range wireless network" is not meant to be limiting and should be interpreted broadly to include at least the following technologies: negotiated wireless peripheral (NWP) devices; short-range wireless air interference networks (e.g., wireless personal area network (wPAN), wireless local area network (wLAN), wireless wide area network (wWAN), Bluetooth™, and the like); wireless peer-to-peer communication (e.g., Ultra Wideband); and any protocol that supports wireless communication of data between devices. Additionally, persons familiar with the field of the invention will realize that a near-range wireless network may be practiced by various data-transfer methods (e.g., satellite transmission, telecommunications network, etc.). Therefore it is emphasized that embodiments of the connections between the client device 215, the data store 220 and the natural language engine 290, for instance, are not limited by the examples described, but embrace a wide variety of methods of communications. In another embodiment, the computing device may internally accommodate the functionality of the semantic interpretation component 250, thereby alleviating dependence on wireless or wired connections.

Exemplary system architecture 200 includes the client device 215 for, in part, supporting operation of the presentation device 275. In an exemplary embodiment, where the client device 215 is a mobile device for instance, the presentation device (e.g., a touchscreen display) may be disposed on the client device 215. In addition, the client device 215 may take the form of various types of computing devices. By way of example only, the client device 215 may be a personal computing device (e.g., computing device 100 of FIG. 1), handheld device (e.g., personal digital assistant), a mobile device (e.g., laptop computer, cell phone, media player), consumer electronic device, various servers, and the like. Additionally, the computing device may comprise two or more electronic devices configured to share information therebetween.

In embodiments, as discussed above, the client device 215 includes, or is operably coupled to the presentation device 275, which is configured to present a UI display 295 on the presentation device 275. The presentation device 275 may be configured as any display device that is capable of presenting information to a user, such as a monitor, electronic display panel, touch-screen, liquid crystal display (LCD), plasma screen, one or more light-emitting diodes (LED), incandescent bulbs, a laser, an electroluminescent light source, a chemical light, a flexible light wire, and/or fluorescent light, or any other display type, or may comprise a reflective surface upon which the visual information is projected. Although several differing configurations of the presentation device 275 have been described above, it should be understood and appreciated by those of ordinary skill in the art that various types of presentation devices that present information may be employed as the presentation device 275, and that embodiments of the present invention are not limited to those presentation devices 275 that are shown and described.

In one exemplary embodiment, the UI display 295 rendered by the presentation device 275 is configured to present a web page (not shown) that is associated with natural language engine 290 and/or a content publisher. In embodiments, the web page may reveal a search-entry area that receives a query and search results that are discovered by searching the semantic index with the query. The query may be manually provided by a user at the search-entry area, or may be automatically generated by software. In addition, as more fully discussed below, the query may include one or more keywords that, when submitted, invokes the natural language engine 290 to identify appropriate search results that are most responsive to the keywords in a query.

The natural language engine 290, shown in FIG. 2, may take the form of various types of computing devices, such as, for example, the computing device 100 described above with reference to FIG. 1. By way of example only and not limitation, the natural language engine 290 may be a personal computer, desktop computer, laptop computer, consumer electronic device, handheld device (e.g., personal digital assistant), various remote servers (e.g., online server cloud), processing equipment, and the like. It should be noted, however, that the invention is not limited to implementation on such computing devices but may be implemented on any of a variety of different types of computing devices within the scope of embodiments of the present invention.

Further, in one instance, the natural language engine 290 is configured as a search engine designed for searching for information on the Internet and/or the data store 220, and for gathering search results from the information, within the scope of the search, in response to submission of the query via the client device 215. In one embodiment, the search engine includes one or more web crawlers that mine available data (e.g., newsgroups, databases, open directories, the data store 220, and the like) accessible via the Internet and build a semantic index 260 containing web addresses along with the subject matter of web pages or other documents stored in a meaningful format. In another embodiment, the search engine is operable to facilitate identifying and retrieving the search results (e.g., listing, table, ranked order of web addresses, and the like) from the semantic index that are relevant to search terms within the submitted query. The search engine may be accessed by Internet users through a web-browser application disposed on the client device 215. Accordingly, the users may conduct an Internet search by submitting search terms at the search-entry area (e.g., surfaced on the UI display 295 generated by the web-browser application associated with the search engine). In another configuration, a search may be conducted whereby a query is submitted to one or more system indexes in order to retrieve contents from a local information store, such as a user's hard-disk.

The data store 220 is generally configured to store information associated with online items and/or materials that have searchable content associated therewith (e.g., documents that comprise the Wikipedia website). In various embodiments, such information may include, without limitation, documents, content of a web page/site, electronic materials accessible via the Internet, a local intranet, or the memory or hard-disk of the user's machine, and other typical resources available to a search engine. In addition, the data store 220 may be configured to be searchable for suitable access of the stored information. In one instance, allowing for suitable access includes selecting or filtering a subset of the documents in the data store according to criteria supplied thereto.

For instance, the data store 220 may be searchable for one or more documents selected for processing by the natural language engine 290. In embodiments, the natural language engine 290 is allowed to freely inspect the data store for documents that have been recently added or amended in order to update the semantic index. The process of inspection may be carried out continuously, in predefined intervals, or upon an indication that a change has occurred to one or more documents aggregated at the data store 220. It will be understood and appreciated by those of ordinary skill in the art that the information stored in the data store 220 may be configurable and may include any information within a scope of an online search. The content and volume of such information are not intended to limit the scope of embodiments of the present invention in any way. Further, though illustrated as a single, independent component, the data store 220 may, in fact, be a plurality of databases, for instance, a database cluster, portions of which may reside on the client device 215, the natural language engine 290, another external computing device (not shown), and/or any combination thereof.

Generally, the natural language engine 290 provides a tool to assist users aspiring to explore and find information online. In embodiments, this tool operates by applying natural language processing technology to compute the meanings of passages in sets of documents, such as documents drawn from the data store 220. These meanings are stored in the semantic index 260 that is referenced upon executing a search. Initially, when a user enters a query into the search-entry area, a query search pipeline 205 analyzes the user's query (e.g., a character string, complete words, phrases, alphanumeric compositions, symbols, or questions) and translates the query into a structural representation utilizing semantic relationships. This representation, referred to hereinafter as a "proposition," may be utilized to interrogate information stored in the semantic index 260 to arrive upon relevant search results.

In one instance, the information stored in the semantic index 260 includes representations extracted from the documents maintained at the data store 220, or any other materials encompassed within the scope of an online search. This representation, referred to hereinafter as a "semantic representation," relates to the intuitive meaning of content distilled from common text and may be stored in the semantic index 260. In embodiments, the semantic representation is derived from a semantic structure utilizing an ordered sequence of term-rewriting rules, or any other heuristics known in the relevant field. In embodiments, the "semantic structure" is generated at an intermediate stage of an analysis pipeline by a document parsing component that converts the content of the document to the semantic structure utilizing, in part, lexical semantic grammar rules.

The architecture of the semantic index 260 allows for rapid comparison of the stored semantic representations against the derived propositions in order to find semantic representations that match the propositions and to retrieve documents mapped to the semantic representations that are relevant to the submitted query. Accordingly, the natural language engine 290 can determine the meaning of a user's query requirements from the query submitted into a search interface (e.g., the search-entry area surfaced on the UI display 295), and then to sift through a large amount of information to find corresponding search results that satisfy those needs.

In embodiments, the process above may be implemented by various functional elements that carry out one or more steps for discovering relevant search results. These functional elements include a query parsing component 235, a document parsing component 240, a semantic interpretation component 245, a semantic interpretation component 250, a grammar specification component 255, the semantic index 260, a matching component 265, and a ranking component 270. These functional components 235, 240, 245, 250, 255, 260, 265, and 270 generally refer to individual modular software routines, and their associated hardware that are dynamically linked and ready to use with other components or devices.

Initially, the data store 220, the document parsing component 240, and the semantic interpretation component 250 comprise an indexing pipeline 210. In operation, the indexing pipeline 210 serves to distill the semantic representations from content within documents 230 accessed at the data store 220, and to construct the semantic index 260 upon gathering the semantic representations. As discussed above, when aggregated to form the semantic index 260, the semantic representations may retain a mapping to the documents 230, and/or location of content within the documents 230, from which they were derived. In other words, the semantic index 260 encodes the semantic representations (being derived from the semantic structures created at the document parsing component 240) generated and conveyed by the semantic interpretation component 250. However, in other embodiments, the document parsing component 240 and semantic interpretation component 250 may be configured as a single element that does not divide the natural language processing into two stages (i.e., LFG parsing and semantic interpretation), but instead, produces semantic representations in a single step, without having a separate stage in which semantic structures are produced.

Generally, the document parsing component 240 is configured to gather data that is available to the natural language engine 290. In one instance, gathering data includes inspecting the data store 220 to scan content of documents 230, or other information, stored therein. Because, the information within the data store 220 may be constantly updated, the process of gathering data may be executed at a regular interval, continuously, or upon notification that an update is made to one or more of the documents 230.

Upon gathering the content from the documents 230 and other available sources, the document parsing component 240 performs various procedures to prepare the content for semantic analysis thereof. These procedures may include text extraction, entity recognition, and parsing. The text extraction procedure substantially involves extracting tables, images, templates, and textual sections of data from the content of the documents 230 and to converting them from a raw online format to a usable format (e.g., HyperText Markup Language (HTML)), while saving links to documents 230 from which they are extracted in order to facilitate mapping. The usable format of the content may then be split up into sentences. In one instance, breaking content into sentences involves assembling a string of characters as an input, applying a set of rules to test the character string for specific properties, and, based on the specific properties, dividing the content into sentences. By way of example only, the specific properties of the content being tested may include punctuation and capitalization in order to determine the beginning and end of a sentence. Once a series of sentences is ascertained, each individual sentence is examined to detect words therein and to potentially recognize each word as an object (e.g., "The Hindenburg"), an event (e.g., "World War II"), a time (e.g., "Sep."), a verb, or any other category of word that may be utilized for promoting distinctions between words or for understanding the meaning of the subject sentence.

The entity recognition procedure assists in recognizing which words are names, as they provide specific answers to question-related keywords of a query (e.g., who, where, when). In embodiments, recognizing words includes identifying words as names and annotating the word with a tag to facilitate retrieval when interrogating the semantic index 260. In one instance, identifying words as names includes looking up the words in predefined lists of names to determine if there is a match. If no match exists, statistical information may be used to guess whether the word is a name. For example, statistical information may assist in recognizing a variation of a complex name, such as "USS Enterprise," which may have several common variations in spelling.

The parsing procedure, when implemented, provides insights into the structure of the sentences identified above. In one instance, these insights are provided by applying rules maintained in a framework of the grammar specification component 255. When applied, these rules, or grammars, expedite analyzing the sentences to distill representations of the relationships among the words in the sentences. As discussed above, these representations are referred to as semantic structures, and allow the semantic interpretation component 250 to capture critical information about the grammatical structure of the sentence (e.g., verb, subject, object, and the like).

The semantic interpretation component 250 is generally configured to diagnose the role of each word in the semantic structure(s), generated by the document parsing component 240, by recognizing a semantic relationship between the words. Initially, diagnosing may include analyzing the grammatical organization of the semantic structure and separating it into logical assertions that each expresses a discrete idea and particular facts. These logical assertions may be further analyzed to determine a function of each of a sequence of words that comprises the assertion. In one instance, determining the function of the sequence of words includes utilizing an ordered sequence of term-rewriting rules, or any other heuristics known in the relevant field.

If appropriate, based on the function or role of each word, one or more of the sequence of words may be expanded to include synonyms (i.e., linking to other words that correspond to the expanded word's specific meaning) or hypernyms (i.e., linking to other words that generally relate to the expanded word's general meaning). This expansion of the words, the function each word serves in an expression (discussed above), a grammatical relationship of each of the sequence of words, and any other information about the semantic representation, recognized by the semantic interpretation component 250, constitutes a semantic representation that may be stored at the semantic index 260 as a semantic representation.

The semantic index 260 serves to store the semantic representation derived by one or many components of the indexing pipeline 210 and may be configured in any manner known in the relevant field. By way of example, the semantic index may be configured as an inverted index that is structurally similar to conventional search engine indexes. In this exemplary embodiment, the inverted index is a rapidly searchable database whose entries are words with pointers to the documents 230, and locations therein, on which those words occur. Accordingly, when writing the semantic structures to the semantic index 260, each word and associated function is indexed along with the pointers to the sentences in documents in which the semantic word appeared. This framework of the semantic index 260 allows the matching component 265 to efficiently access, navigate, and match stored information to recover meaningful search results that correspond with the submitted query.

The client device 215, the query parsing component 235, and the semantic interpretation component 245 comprise a query conditioning pipeline 205. Similar to the indexing pipeline 210, the query conditioning pipeline 205 distills meaningful information from a sequence of words. However, in contrast to processing passages within documents 230, the query conditioning pipeline 205 processes words submitted within a query 225. For instance, the query parsing component 235 receives the query 225 and performs various procedures to prepare the words for semantic analysis thereof. These procedures may be similar to the procedures employed by the document parsing component 240 such as text extraction, entity recognition, and parsing. In addition, the structure of the query 225 may be identified by applying rules maintained in a framework of the grammar specification component 255 and in the semantic interpretation component 245, thus, deriving a meaningful representation, or proposition, of the query 225.

In embodiments, the semantic interpretation component 245 may process the query semantic representation in a substantially comparable manner as the semantic interpretation component 250 interprets the semantic structure derived from a passage of text in a document 230. In other embodiments, the semantic interpretation component 245 may identify a grammatical and/or semantic relationship of keywords within a string of keywords (e.g., a question or a phrase) that comprise the query 225. By way of example, identifying the grammatical and/or semantic relationship includes identifying whether a word or phrase functions as the subject (agent of an action), object, predicate, indirect object, or temporal location of the proposition of the query 225. In another instance, the proposition is evaluated to identify a logical language structure associated with each of the keywords. By way of example, evaluation may include one or more of the following steps: determining a function of at least one of the keywords; based on the function, replacing the keywords with a logical variable that encompasses a plurality of meanings (e.g., associating with the function a plurality of meanings); and writing those meanings to the proposition of the query. This proposition of the query 225, the keywords, and the information distilled from the proposition and/or keywords are then sent to the matching component 265 for comparison against the semantic representations extracted from the documents 230 and stored at the semantic index 260.

In an exemplary embodiment, the matching component 265 compares the propositions of the queries 225 against the semantic representations at the semantic index 260 to ascertain matching semantic representations. These matching semantic representations may be mapped back to the documents 230 from which they were extracted by associating the documents 230, and the locations therein, from which the semantic representations were derived. These documents 230, targeted by the associated locations, are collected and sorted by the ranking component 270. Sorting may be performed in any known method within the relevant field, and may include without limitation, ranking according to closeness of match, listing based on popularity of the returned documents 230, or sorting based on attributes of the user submitting the query 225. These ranked documents 230 comprise the search result 285 and are conveyed to the presentation device 275 for surfacing in an appropriate format on the UI display 295.

With continued reference to FIG. 2, this exemplary system architecture 200 is but one example of a suitable environment that may be implemented to carry out aspects of the present invention and is not intended to suggest any limitation as to the scope of use or functionality of the invention. Neither should the illustrated exemplary system architecture 200, or the natural language engine 290, be interpreted as having any dependency or requirement relating to any one or combination of the components 235, 240, 245, 250, 255, 260, 265, and 270 as illustrated. In some embodiments, one or more of the components 235, 240, 245, 250, 255, 260, 265, and 270 may be implemented as stand-alone devices. In other embodiments, one or more of the components 235, 240, 245, 250, 255, 260, 265, and 270 may be integrated directly into the client device 215. It will be understood by those of ordinary skill in the art that the components 235, 240, 245, 250, 255, 260, 265, and 270 illustrated in FIG. 2 are exemplary in nature and in number and should not be construed as limiting.

Accordingly, any number of components may be employed to achieve the desired functionality within the scope of embodiments of the present invention. Although the various components of FIG. 2 are shown with lines for the sake of clarity, in reality, delineating various components is not so clear, and metaphorically, the lines would more accurately be grey or fuzzy. Further, although some components of FIG. 2 are depicted as single blocks, the depictions are exemplary in nature and in number and are not to be construed as limiting (e.g., although only one presentation device 275 is shown, many more may be communicatively coupled to the client device 215).

Figure 3:
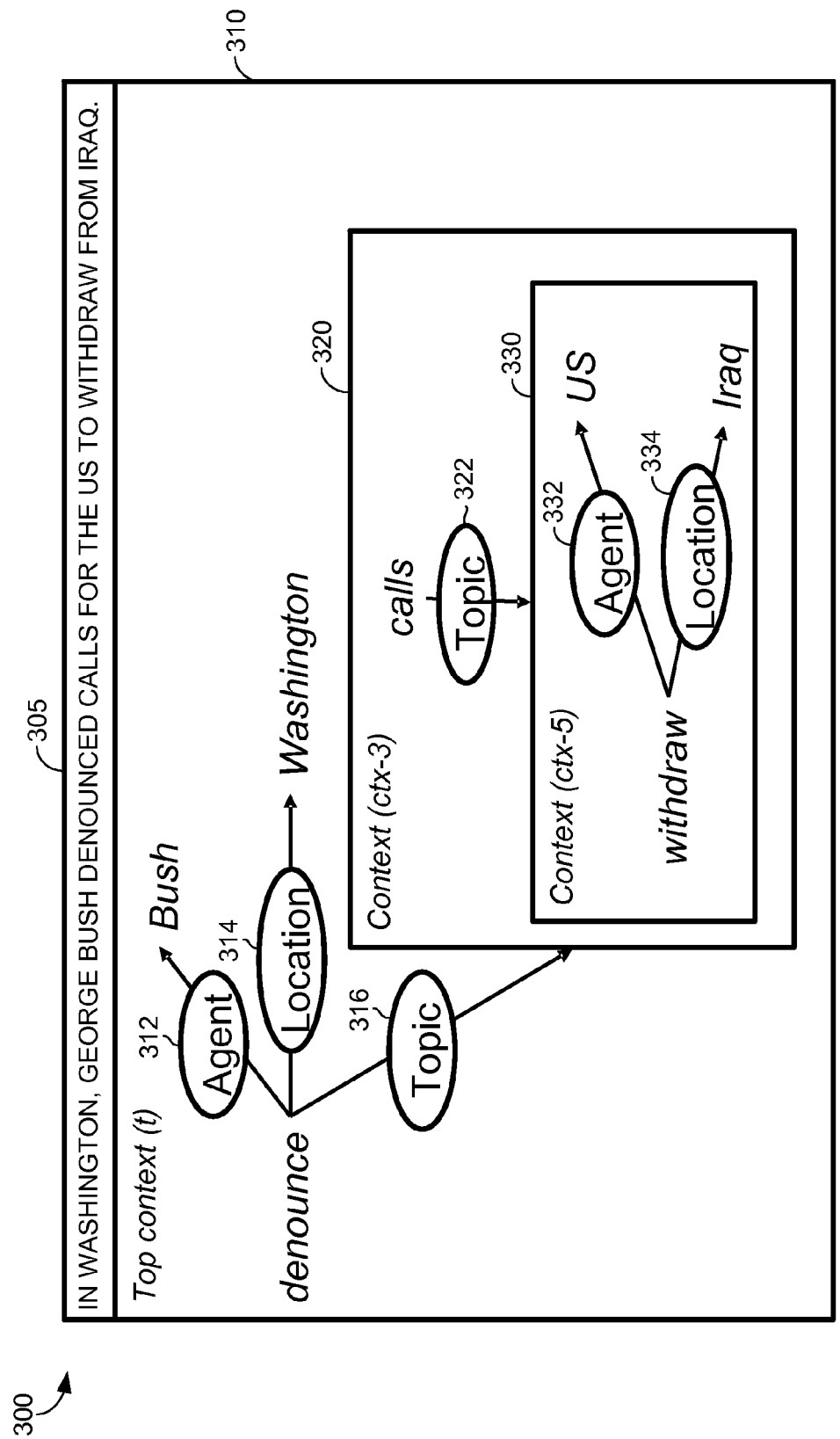
FIG. 3 is a diagram of a semantic representation generated from a text portion within a document, in accordance with an embodiment of the present invention.

Turning now to FIG. 3, diagram 300 of a semantic representation generated from a text portion within a document is illustrated, in accordance with an embodiment of the present invention. Text portions may be extracted from content of one or more documents, for example, which may be stored in a data store for easy access during indexing. In one embodiment, the document from which text portions are extracted is a web document, but the document in other embodiments may be any kind of text-based document from any type of collection of documents. It will become clear to one of ordinary skill in the art that any type of document may be retrieved, such as documents retrieved from any document collection or even for the analysis of a particular document with a collection. Text portions may include reported speech and other attitude reports, which may be identified by a plurality of words found in the text portion, such as, but certainly not limited to, denounce, say, believe, desire, deny, etc. These words are identified in attitude reports because they describe a person's attitude toward a certain topic. Reported speech may take the form of direct quotations from a person, or may be second hand reported speech. As the following examples are shown and described, a variety of forms of reported speech and other attitude reports, including those mentioned above, will become apparent.

Semantic representations generally encompass three main objectives, including, but not limited to, meanings of various words, relationships between the words, and contexts. Semantic representations allow for a more thorough understanding of text than merely depending on keywords from a query matched with words in documents (e.g., web documents), for example. Here, relationships are determined to allow for a deeper analysis of text. The diagram 300 includes a text portion 305, a first level of association 310, a second level of association 320, and a third level of association 330. Each level of association 310, 320, and 330 contains one or more elements, and one or more relational elements. The relational elements are represented by items 312, 314, 316, 322, 332, and 334 in the embodiment of FIG. 3. The elements include the words "denounce," "Bush," "Washington," "calls," "withdraw," "US," and "Iraq." Also illustrated for each level of association is a reporting act, which, here, are the words "denounce," "calls," and "withdraw." As such, in some embodiments, there may be some words that are elements, but are also categorized as reporting acts, such as "denounce," "calls," and "withdraw."

To clearly illustrate the embodiment of FIG. 3, a semantic representation is shown for text portion 305, which is as follows: "In Washington, George Bush denounced calls for the US to withdraw from Iraq." It should be noted that FIG. 3 is a diagram of the semantic representation reproduced below. The example is provided in both a diagram format and as a semantic representation for illustration purposes only. In some embodiments, semantic representations are generated and stored in a semantic index, such as semantic index 260 of FIG. 2, but diagrams are not generated. In these embodiments, diagrams are reproduced for illustration and exemplary purposes only.

| | |
|---|---|
| Context(top): | DNC agent: B |
| Context(top): | DNC topic: Context(3) |
| Context(top): | DNC location: W |
| Context(3): | CL topic: Context(5) |
| Context(5): | WTHD agent: U |
| Context(5): | WTHD location: I |
| word: B | [George_Bush, person] Context(top) |
| word: DNC | [denounce, criticize, say] Context(top) |
| word: W | [Washington_D", city, location] Context(top) |
| word: CL | [call, say] Context(3) |
| word: WTHD | [withdraw, move] Context(5) |
| word: U | [United_States_of_America, country, location] Context(5) |
| word: I | [Iraq, country, location] Context(5) |

As shown, there are three levels of associations, also referred to herein as contexts, that have been identified in the text portion (i.e., item 305 in FIG. 3). The levels of association, or contexts, are Context(top), Context(3), and Context(5). The levels of association are identified as being the topic of the reporting acts, which are generally action words, and in some embodiments, are verbs. Here, "denounce" is the reporting act associated with the first level of association 310. The second level of association 320 may be considered to be the topic of the reporting act, "denounce," identified in the first level of association 310. Similarly, the third level of association 330 may be the topic of the reporting act, "calls," identified in the second level of association 320.

Levels of association are formed to gather together a bundle of relations that all hold true in the same way. A top level of association, such as Context(top), may be one that holds true according to every question of the sentence. For example, in the embodiment of FIG. 3, it may be true that Bush made the statement in Washington no matter what he denounced. That statement that was denounced by Bush is imbedded context, and the imbedded context in this embodiment is "calls for the US to withdraw from Iraq." As withdrawals from Iraq have not taken place, according to this example, this statement is located in a second level of association, which here, may be termed a hypothetical context. Using the contextual structure or levels of association outlined above, different semantic relations may be identified as holding true in different circumstances or in different ways.

Reporting acts may be determined based on a number of factors, and a reporting act may be identified for each level of association. A reporting act, in some instances is an action word, such as, in the embodiment of FIG. 3, "denounce," "calls," and "withdraw." Reporting acts may be, for instance, verbs, nouns, and the like, and are typically determined by the surrounding text, or how the word is used in the sentence. This type of grammatical information may be determined, for example, by applying a set of rules, which may be maintained in a framework of the grammar specification component 255 of FIG. 2, for example. By applying a set of rules, or grammars, relationships of words are determined, which leads to the identification of reporting acts.

As shown in FIG. 3, reporting acts are linked to elements, such as words or phrases, or may be linked to a different level of association. Reporting acts are identified as roles of an event, which in this example, may be termed a denunciation event. For example, "denounce" is identified as the reporting act for a first level of association 310. The word "denounce" is linked to the word "Bush" and the word "Washington," both appearing in the text portion being semantically analyzed. "Denounce" is linked to "Bush" because "Bush" is an agent of the word "denounce," as Bush is actually doing the denouncing. Therefore, agent 312 is a relational element linking the two words together thus forming a semantic relationship. Likewise, location 314 is a relational element linking two words together, which include "denounce" and "Washington." In order to link a relational element with a word(s) within a different layer of context, a topic may be found that links the two together. For example, it may be determined what event is being denounced, and that may be the topic of the reporting act "denounce." Here, calls for something may be the topic 316 of "denounce," and even further, withdrawal of the US from Iraq may be identified as the topic 322 of "calls," or a calling event, which is the reporting act within the second level of association. Within the third level of association 330, "US" is identified as the agent 332 of a withdrawal, and "Iraq" is a location 334 of a withdrawal.

Elements are parsed from raw content, and here, include words such as "denounce," "Bush," "Washington," "calls," "withdraw," "US," and "Iraq." One or more of these words may have similar meanings that may be represented in a semantic representation by a logical variable. This logical variable may represent a plurality of synonyms having meanings similar to the element, categories into which the element fits, and may also represent a number of meanings that the element may have. Some elements are easier than others to determine the correct meaning. Meanings may be determined, in one instant, based on how the element is used within the context of the text portion. As shown above, "Bush" is identified as "George Bush," which is identified as a person. "Denounce," the reporting act, is associated with both "criticize" and "say," provided here for exemplary purposes only. There may be a plurality of other words having a similar meaning to "denounce," and may also be determined to be associated with it. Also, "Washington" is associated with categories including city, and location. "Withdraw" is associated with "move," and both "US" and "Iraq" are categorized as a country and a location.

Semantic representations, such as that illustrated in FIG. 3, allow for better, more accurate and more relevant search results to be returned to a user after the user's query is received and analyzed. For example, by parsing the text (e.g., target statement),"In Washington, George Bush denounced calls for the US to withdraw from Iraq," and developing semantic relationships as described above, this text may be returned to a user upon receiving a natural language query such as, "What did Bush say about Iraq," but not "What did Bush say about Washington." A conventional keyword search, on the assumption that it could identify "denouncing" as a form of "saying," would give the terms "Washington," "US," and "Iraq" equal prominence in the target sentence, leading to its retrieval by a keyword query such as "say Bush Washington." A more advanced indexing scheme that linked the term "denounced" to its direct argument, "calls," but which went no further, would fail to detect that the denunciation was about Iraq. The term "Washington" is excluded from being linked to "denounce" other than by a reporting act of location 314, as it is not identified as being embedded inside the text portion that is being analyzed.

Figure 4:
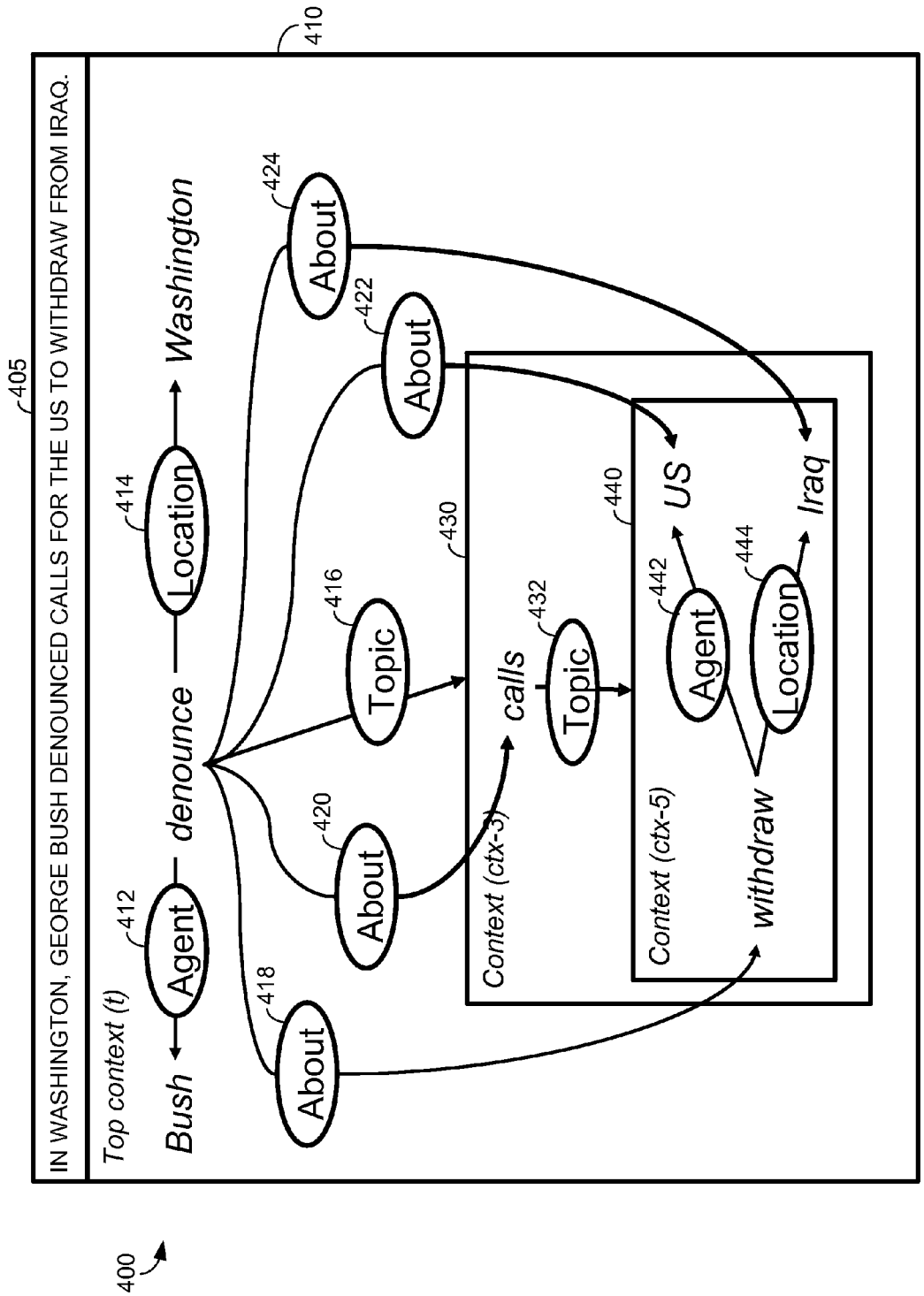
FIG. 4 is a diagram of a semantic representation generated from a text portion within a document, in accordance with an embodiment of the present invention.

FIG. 4 illustrates a diagram 400 of a semantic representation generated from a text portion within a document, in accordance with an embodiment of the present invention. Again, text portions may include reported speech and other attitude reports, which may be identified by a plurality of words found in the text portion, such as, but certainly not limited to, denounce, say, believe, desire, deny, etc. Although the embodiment of FIG. 3 provides a semantic representation as a result of analyzing semantic relationships between words, this representation may be supplemented with information about which arguments to the verb "denounce" convey the content of the denunciation. Additional lexical information may be added to indicate what the denunciation is about. Below is a semantic representation of the same text as was used in FIG. 3, which is as follows: "In Washington, George Bush denounced calls for the US to withdraw from Iraq." Here, however, "about" relationships are formed in addition to the relationships formed in the embodiment of FIG. 3 to provide for even more relevant search results after receiving a query.

| | |
|---|---|
| Context(top): | DNC agent: B |
| Context(top): | DNC topic: Context(3) |
| Context(top): | DNC location: W |
| Context(top): | DNC about: CL |
| Context(top): | DNC about: WTHD |
| Context(top): | DNC about: U |
| Context(top): | DNC about: I |
| Context(3): | CL topic: Context(5) |
| Context(5): | WTHD agent: U |
| Context(5): | WTHD location: I |
| word: B | [George_Bush, person] Context(top) |
| word: DNC | [denounce, criticize, say] Context(top) |
| word: W | [Washington_DC, city, location] Context(top) |
| word: CL | [call, say] Context(3) |
| word: WTHD | [withdraw, move] Context(5) |
| word: U | [United_States_of_America, country, location] Context(5) |
| word: I | [Iraq, country, location] Context(5) |

There are a variety of methods by which "aboutness" linking may be computed and recorded. One way is to compute the transitive closure of context and argument linkages starting from the topic argument, and marking any term within this closure as being what the report is about. This is shown in the semantic representation above, and is also shown in FIG. 4.

FIG. 4 illustrates a text portion 405, of which is semantically represented. As with FIG. 3, FIG. 4 illustrates three levels of association, those being a first level of association 410, a second level of association 430, and a third level of association 440. "Denounce" is the reporting act of the first level of association 410, "calls" is the reporting act of the second level of association 430, and "withdraw" is the reporting act of the third level of association 440. As shown, "denounce," now has more semantic relationships than it did in the embodiment of FIG.3, as "about" relationships are now shown in addition to the previous relationships. Semantic relationships have been determined between "denounce" and each of "Bush" with relational element agent 412, "Washington" with relational element location 414, and a second layer of association 430 with relational element topic 416 of the denunciation event. Further, the third layer of association 440 is the topic 432 of calls, "US" is an agent 442 of withdraw, and "Iraq" is a location 444 of withdraw.

In addition to these relationships, several "about" relationships are illustrated, including about 418 linked to "withdraw" in a third layer of association 440, about 420 linked to "calls" in the second layer of association 430, about 422 linked to "US" in the third layer of association 440, and about 424 linked to "Iraq," also in the third layer of association 440. As such, the denunciation event is about a withdrawal, is about calls, is about the US, and is about Iraq. As shown, the denunciation event is not about Bush, nor is it about Washington. Determining these "about" relationships and avoiding "about" relationships with Bush and Washington, for example, eliminates irrelevant search results returned to a user.

Figure 5:
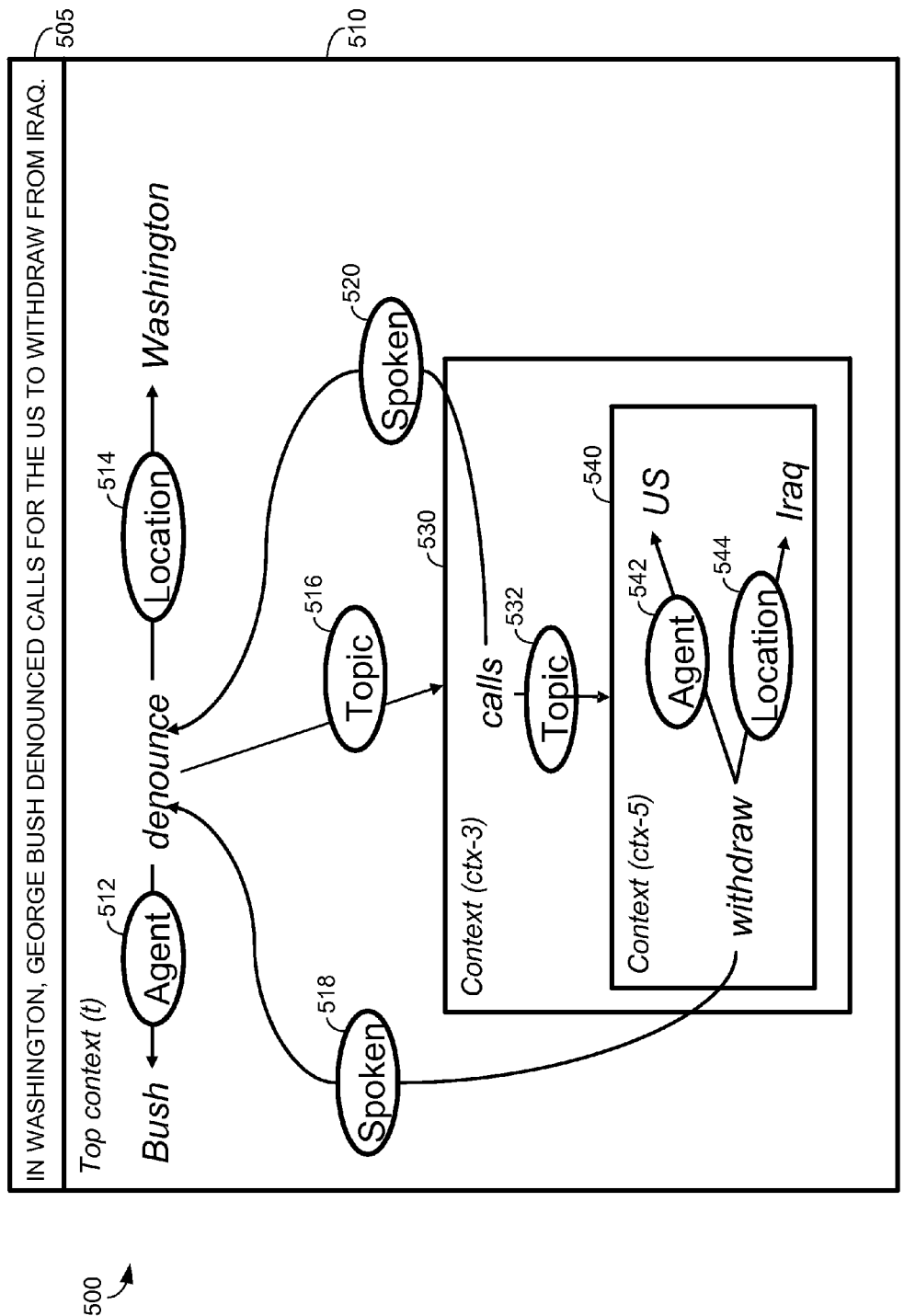
FIG. 5 is a diagram of a semantic representation generated from a text portion within a document, in accordance with an embodiment of the present invention.

Referring to FIG. 5, a diagram 500 of a semantic representation generated from a text portion within a document is shown, in accordance with an embodiment of the present invention. The semantic representation of this embodiment is shown below for the following text portion 505: "In Washington, George Bush denounced calls for the US to withdraw from Iraq."

| | |
|---|---|
| Context(top): | DNC agent: B |
| Context(top): | DNC topic: Context(3) |
| Context(top): | DNC location: W |
| Context(3): | CL topic: Context(5) |
| Context(3): | CL spoken: DNC |
| Context(5): | WTHD agent: U |
| Context(5): | WTHD location: I |
| Context(5): | WTHD spoken: DNC |
| word: B | [George_Bush, person] Context(top) |
| word: DNC | [denounce, criticize, say] Context(top) |
| word: W | [Washington_DC, city, location] Context(top) |
| word: CL | [call, say] Context(3) |
| word: WTHD | [withdraw, move] Context(5) |
| word: U | [United_States_of_America, country, location] Context(5) |
| word: I | [Iraq, country, location] Context(5) |

As shown above, instead of marking each element that the report is about, as was the case in FIG. 4, the index marks only the head of each reported fact. For instance, FIG. 5 illustrates that "denounce" has been identified as a reporting act of a first level of association 510, and is linked to various elements such as "Bush" by relational element agent 512, and to "Washington" by relational element location 514. Further, the topic 516 of "denounce" has been identified as "calls for the US to withdraw from Iraq," which is embodied in part within a second level of association 530, and part within a third level of association 540. "Calls" is linked to the third level of association 540 by relational element topic 532. Within the third level of association 540, "withdraw" is linked to both "US" and "Iraq" by relational elements agent 542 and location 544, respectively.

In addition to the relationships defined above and in lieu of "about" relationships, there are two relational elements called spoken, and are shown as spoken 518 linked to "withdraw" and spoken 520 linked to "calls." This framework still allows for a connection between "denounce" and "withdraw," "US," and even "Iraq." The difference is that these relationships in the embodiment of FIG. 5 are indirect relationships, rather than direct relationships. As described above, the tradeoff in utilizing this embodiment is decreased memory usage within the index, but increased time required for computation after a query is received.

With continued reference to FIG. 5, an alternative embodiment to the embodiment of FIG. 4, for example, is illustrated, which demonstrates the concept of space-time tradeoffs. As can be seen by comparing the diagram of FIG. 4 and the diagram of FIG. 5, the diagram of FIG. 5 appears to be simpler, as it does not explicitly contain any "about" relationships using "about" relational elements. As FIG. 5 contains fewer identified relationships, it occupies a smaller amount of space within an index, and therefore a data store where the index is stored. While less memory and storage space may be used for the embodiment of FIG. 5, more time may be required to match a query proposition with semantic representations within the index, as the "about" relationships have not already been identified. In other words, "about" relationships have not been explicitly coded within the index to allow for a quick comparison. This requires much more computing on the back end, which may result in increased wait times for users. Alternatively, the embodiment of FIG. 4 explicitly computes "about" relationships up front and stores those relationships in the index, which allows for a quick comparison of query propositions to semantic representations, resulting in less time required for computations after the user has entered a query.

Figure 6:
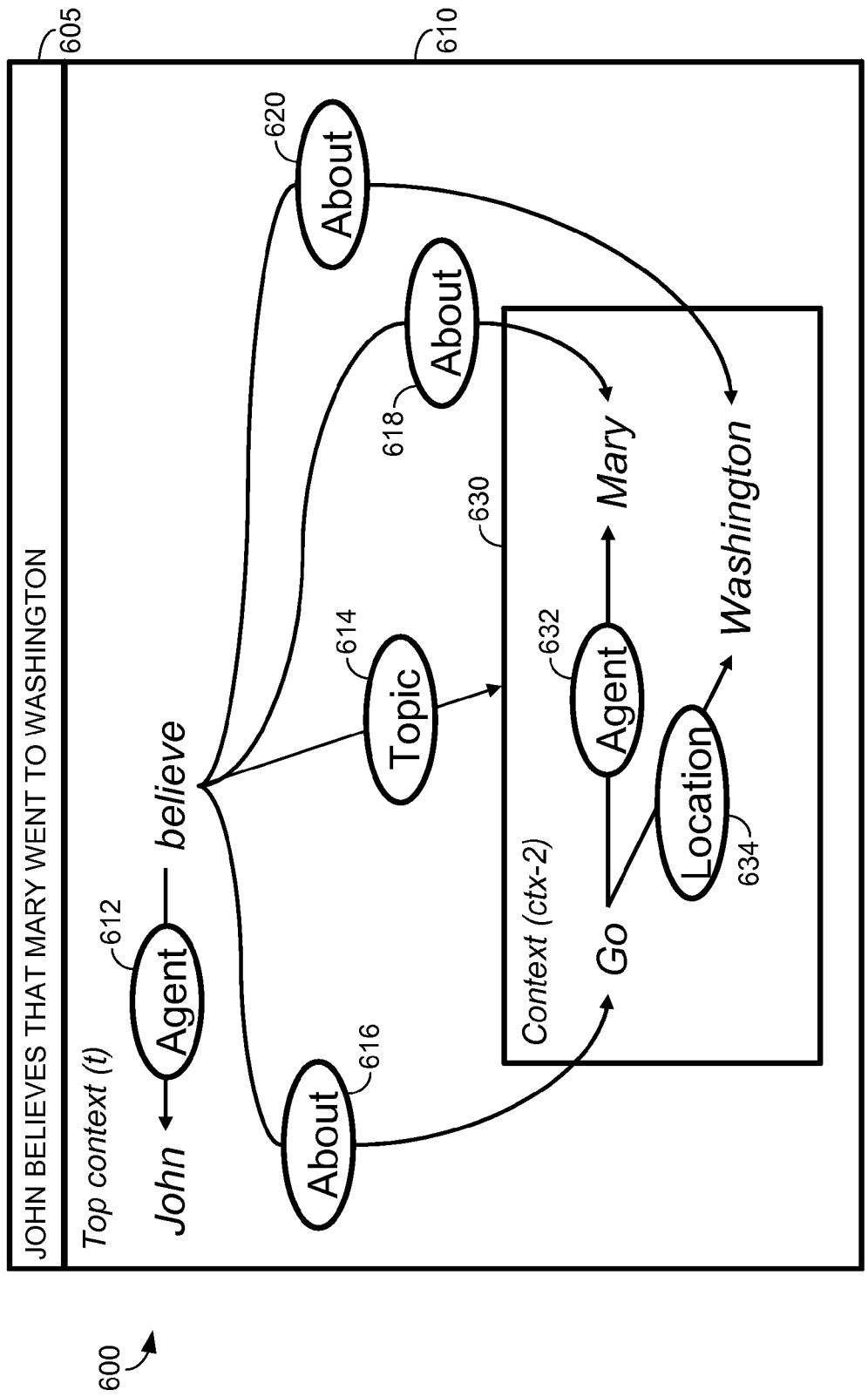
FIG. 6 is a diagram of a semantic representation generated from a text portion within a document, in accordance with an embodiment of the present invention.

FIG. 6 illustrates a diagram 600 of a semantic representation generated from a text portion within a document, in accordance with an embodiment of the present invention. The embodiment of FIG. 6 illustrates a similar, yet simpler example than the embodiment of FIGS. 3 and 4. The text portion 605 states the following: "John believes that Mary went to Washington." Below is the semantic representation of text portion 605.

| | |
|---|---|
| Context(top): | BEL agent: J |
| Context(top): | BEL topic: Context(2) |
| Context(top): | BEL about: G |
| Context(top): | BEL about: M |
| Context(top): | BEL about: W |
| Context(2): | G agent: M |
| Context(2): | G location: W |
| word: J | [John, person] Context(top) |
| word: BEL | [believe] Context(top) |
| word: W | [Washington_DC, city, location] Context(2) |
| word: G | [go, move] Context(2) |
| word: M | [Mary, person] Context(2) |

The elements parsed from raw content include "John," "believe," "go," "Mary," and "Washington." "Believe" is identified as the reporting act within a first level of association

610, and "go" is the reporting act within a second level of association 630. Relational elements, which as defined above, link elements together and describe the type of association, include agent 612, topic 614, about 616, about 618, about 620, agent 632, and location 634. The second level of association 630 is the topic of "believe," while there are three words that are "about" the reporting act of "believe." "Believe" is about "Mary," where Mary "went" (e.g., go), and where Mary went (e.g., "Washington"). Again, a logical variable, in some embodiments, may be replaced with an element, and the logical variable may be associated with a plurality of synonyms, various meanings of that element or word, or the like.

Figure 7:
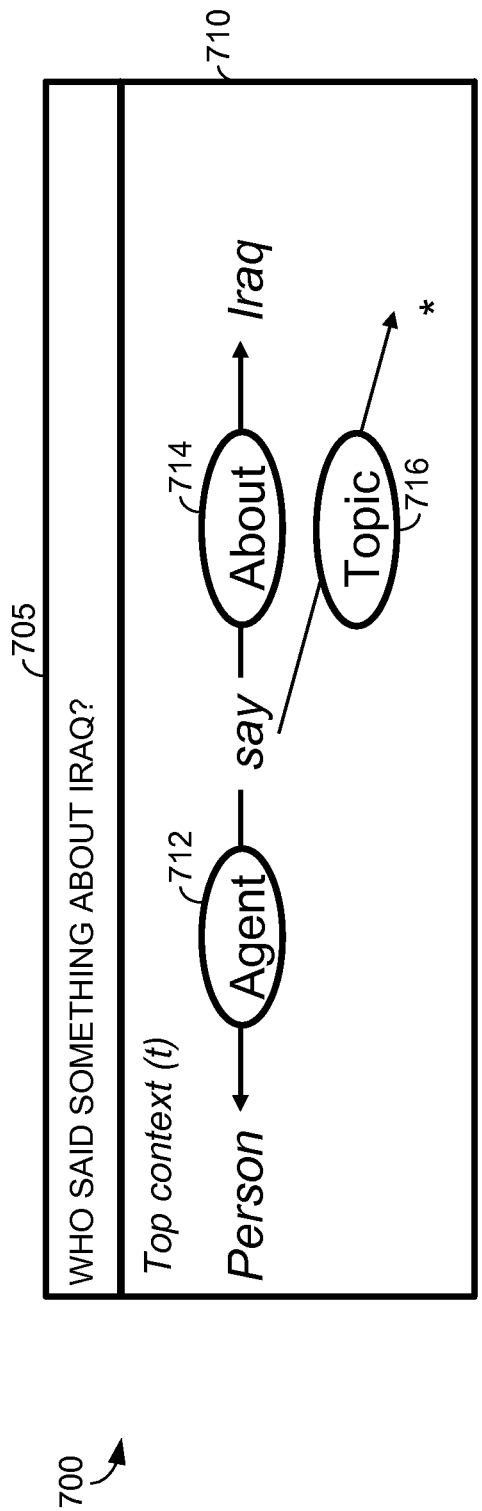
FIG. 7 is a diagram of a proposition generated from a search query, in accordance with an embodiment of the present invention.

Turning now to FIG. 7, a diagram 700 of a proposition generated from search query is shown, in accordance with an embodiment of the present invention. A proposition is generated in a similar fashion as a semantic representation (e.g., representation of content derived from a web document). Here, the query 705 is as follows: "Who said something about Iraq?" The proposition is shown below.

| Context(top): | SY-2 agent: P-2 |
| Context(top): | SY-2 topic: E-2 |
| Context(top): | SY-2 about: I-2 |
| word: P-2 | [person] Context(top) |
| word: SY-2 | [say] Context(top) |
| word: E-2 | [*] Context(top) |
| word: I-2 | [Iraq, country, location] Context(top) |

Parsing and performing a semantic analysis on queries is typically much simpler than performing the same analysis on content of documents, as queries are generally shorter in length, and may contain only one level of association, as illustrated in FIG. 7. The level of association 710 contains several elements that have been parsed or identified, including "Person," "say," and "Iraq." There is an additional element, but it is similar to a wild card, as it can be many things, not just one word. This additional element represents the word "something " from the query. In one embodiment, elements such as "something" that can match anything may be extracted from the query when the query is being parsed, so as to not pose a restriction when the proposition is being matched to the semantic representation.

The proposition illustrated in FIG. 7 also includes a reporting act, "say," in addition to several relational elements. Agent 712 links "person" to "say." About 714 links "say" to "Iraq," and topic 716 links "say" to the wild card element, which as mentioned above, can be anything. As shown, the word "who" is replaced with "person" in the proposition.

A semantic representation generated from content of a document (e.g., web document), such as those shown above in relation to FIGS. 3 and 4, and a proposition generated from a query, such as that shown above in relation to FIG. 6, may be matched or linked in order to determine the most relevant search results from the received query. For example, the semantic representation below illustrates a matching of a semantic representation and a proposition. The matches are shown adjacent to each other.

| Context(top): | DNC agent: B | Context(top): | SY-2 agent: P-2 |
| Context(top): | DNC topic: Context(3) | Context(top): | SY-2 topic: E-2 |
| Context(top): | DNC location: W | | |
| Context(top): | DNC about: CL | | |
| Context(top): | DNC about: WTHD | | |
| Context(top): | DNC about: U | | |
| Context(top): | DNC about: I | Context(top): | SY-2 about: I-2 |
| Context(3): | CL topic: Context(5) | | |
| Context(5): | WTHD agent: U | | |
| Context(5): | WTHD location: I | | |
| word: B | [George_Bush, person] Context(top) | word: P-2 | [person] Context(top) |
| word: DNC | [denounce, criticize, say] Context(top) | word: SY-2 | [say] Context(top) |
| word: W | [Washington_DC, city, location] Context(top) | | |
| word: CL | [call, say] Context(3) | word: E-2 | [*] Context(top) |
| word: WTHD | [withdraw, move] Context(5) | | |
| word: U | [United_States_of_America, country, location] Context(5) | | |
| word: I | [Iraq, country, location]Context(5) | word: I-2 | [Iraq, country, location] Context(top) |

If there is a match of relational elements, such as the match of agent to agent, the elements associated with the relational elements are then inspected to determine if the words are the same, or even similar. Above, it was mentioned that "denounce" was associated with "say" in order to broaden the search, and "Bush" was associated with "person" for the same reason. Therefore, a match is found between Context(top): DNC agent: B and Context(top): SY-2 agent:P-2.

Figure 8:
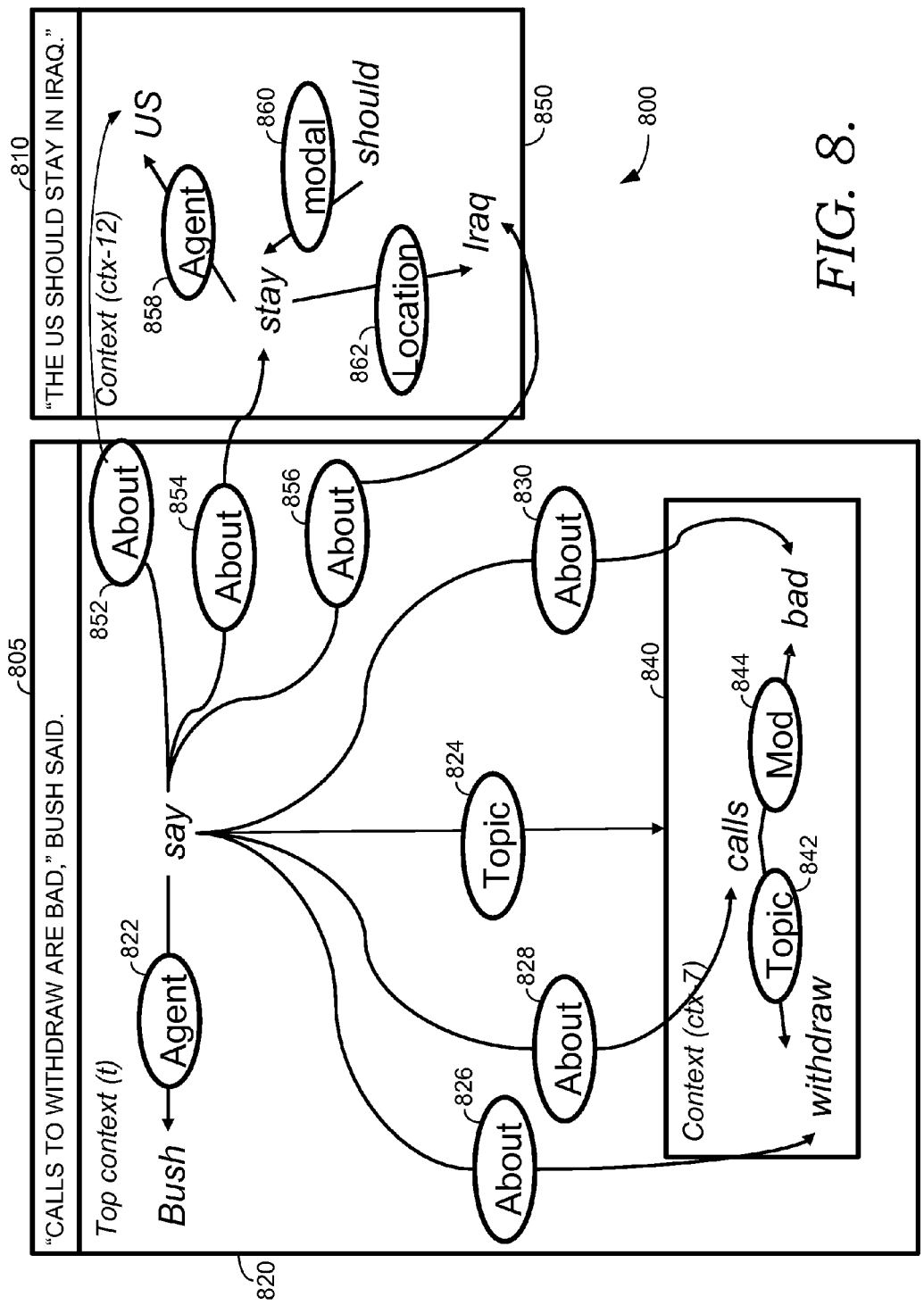
FIG. 8 is a diagram of a semantic representation generated from a text portion within a document, the text portion comprising two sentences, in accordance with an embodiment of the present invention.

FIG. 8 illustrates a diagram 800 of a semantic representation generated from a text portion within a document, the text portion comprising two sentences, in accordance with an embodiment of the present invention. The embodiment of FIG. 8 illustrates that more than one sentence may be represented in a single semantic representation, especially if the sentences are related. Here, both sentences are authored by the same person, Bush. Therefore, it makes sense and is relevant to put both sentences in a single representation. It should be noted that any number of sentences or even phrases may be grouped together to generate a semantic representation. The process of parsing content extracted from a document (e.g., web document), for example, may be performed by applying a set of rules to test the character string for specific properties, such as punctuation used and capitalization. This set of rules, by understanding these properties, may be able to determine various sentences or phrases that belong together, such as those illustrated in FIG. 8 as text portions 805 and 810. This process may be performed by a document parsing component, such as component 240 of FIG. 2.

For the first text portion 805, there are two levels of association shown. The first level of association 820 (e.g., Top context (t)), and the second level of association 840 (e.g., Context (ctx-7)) are directly linked by the reporting act "say" located within the first level of association 820. "Say" and the second level of association 840 are associated by a topic relational element 824, such that the sentence "calls to withdraw are bad" is the topic of what Bush said. A plurality of "about" relationships are also formed, and as mentioned above, allow for a greater accuracy of search results. Within the first level of association 820, "say" is linked to "Bush" through an agent relational element 822, as Bush is the person or agent who spoke or said those words. Further, about relational elements 826, 828, and 830 are linked from "say" to "withdraw," "calls," and "bad," respectively. These "about" relationships or associations allow for efficient and effective matching of these relationships to similar relationships found in query propositions. Additional, within the second layer of association 840, reporting act "calls" is directly linked to "withdraw" by relational element topic 842, and to "bad" by relational element modifier 844.

It should be noted that there are a number of ways that one could work down through the diagram associated with the first text portion 805. For example, in order to arrive at "withdraw," one path is to go from "say" directly to "withdraw" by utilizing an "aboutness" relationship (e.g., relational element about 826). Another path indirectly reaches "withdraw" by first utilizing relational element about 828 to arrive at "calls," and then linking to "withdraw" by relational element topic 842, as "withdraw" is the topic of "calls." Further, using relational element topic 824, the second layer of association 840 may be reached, wherein "withdraw" is found within that second layer of association 840.

Looking at the second text portion 810 separately from the first, reporting act "stay" is identified for that text portion. The text portion is fairly simple and short, and therefore, only one level of association 850 is identified (e.g., Context (ctx-12)). "Stay" is associated or linked with "US" by a relational element agent 858, and "Iraq" by a relational element location 862. In addition, the term "should" is found within the text portion 810. For linguistic purposes, "should" may be termed a modal, which is an expression broadly associated with notions of possibility and necessity. As such, a modal (e.g., should) is used as a relational element 860 in this embodiment, and is associated with "stay." The two text portions 805 and 810 may now be intertwined as to determine "aboutness" relations between the first text portion 805 and the second text portion 810. FIG. 8 illustrates that "about" relationships are formed between "say" and "US," "stay," and "Iraq" through relational elements about 852, about 854, and about 856, respectively.

Figure 9:
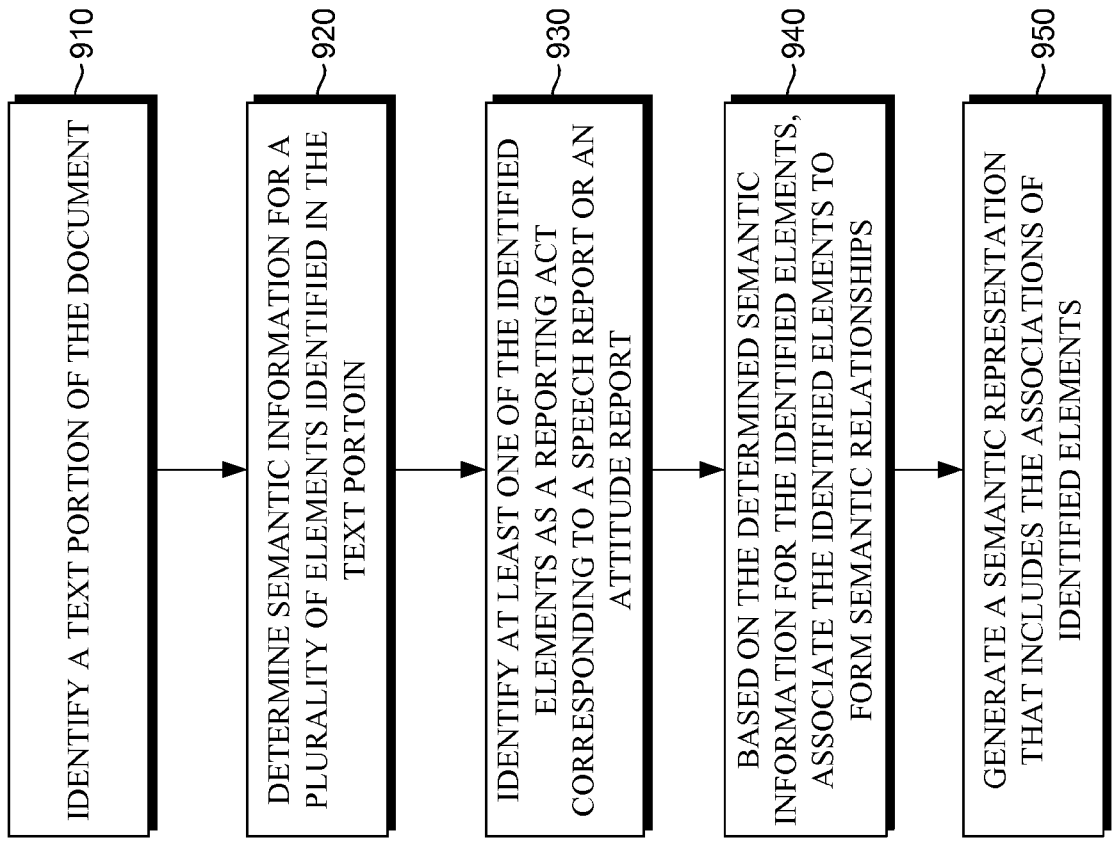
FIG. 9 is a flow diagram illustrating a method for developing semantic relationships between elements distilled from content of a document, in accordance with an embodiment of the present invention.

Now referring to FIG. 9, a flow diagram 900 illustrating a method for developing semantic relationships between elements distilled from content of a document to generate a semantic representation of the content is shown, in accordance with an embodiment of the present invention. Initially, a text portion of a document is identified at step 910, which allows for the identified text portion to be indexed and stored in semantic index 260 of FIG. 2, for example. Text portions may be derived from content of one or more documents, such as web pages, which may be stored in a data store, such as data store 220 of FIG. 2. When content is extracted from a document, the format of the content may be a raw online format that requires conversion. In one embodiment, the content is converted from a raw online format to a HyperText Markup Language (HTML) to generate the text portion. Content may be extracted in the form of one or more sentences or phrases, a table, a template, or a plurality of data. Text portions may include reported speech and other attitude reports, which may be identified by a plurality of words found in the text portion, such as, but certainly not limited to, denounce, say, believe, desire, deny, etc. These words are identified in attitude reports because they describe a person's attitude toward a certain topic. Reported speech may take the form of direct quotations from a person, or may be second-hand reported speech.

In one embodiment, the text portion may be parsed in order to identify one or more elements that are to be semantically represented for further indexing. Parsing may also include text extraction and entity recognition, wherein an entity is recognized by searching a predefined list of words stored in data store 220, for example. This procedure assists in that it recognizes words that may be names of a person or thing. At step 920, semantic information for each of the identified elements is determined. The semantic information may include one or more meanings and/or grammatical functions of the identified elements therein. In one embodiment, synonyms or hyponyms may also be determined and included as semantic information. Further, in some embodiments, one or more words may have similar meanings, and those words and meanings may be represented in a semantic representation by a logical variable by replacing a certain element with the logical variable. This logical variable may represent a plurality of synonyms having meanings similar to the element, categories of which the element fits, and may also represent a number of meanings that the element may have, which allows for a broadened, but more accurate search. Logical variables may be stored in a data store.

At step 930, at least one of the identified elements are identified as a reporting act that corresponds to a speech report or an attitude report. Step 940 indicates that identified elements are associated with one another to form semantic relationships, and the formed associations are based on the semantic information determined at step 920 above. In one embodiment, one or more levels of association, or contexts, may be determined, and each level of association may include one or more of the identified elements. Elements within different levels of association may be associated with each other, and may be associated by way of a reporting act. Reporting acts may be, for instance, verbs, nouns, or the like, and are typically determined by the surrounding text, or how the word is used in the sentence. This type of grammatical information may be determined, for example, by applying a set of rules, which may be maintained in a framework of grammar specification component 255 of FIG. 2, for example. For exemplary purposes only, suppose a text portion recites: "In Washington, Bush denounced calls for the US to withdraw from Iraq." Here, three levels of association may be identified, each containing a reporting act. The reporting acts for the three respective levels of association may be identified as "denounced," "calls," and "withdraw."

In addition to levels of association (e.g., contexts) and reporting acts, relational elements may also be determined, which describe the relationship between a reporting act and an element or a level of association. For example, with continued reference to the example above, "Bush" may be associated or linked to "denounced" by way of a relational element agent, as Bush is the agent doing the denouncing. Relational elements may take various forms of relationships, but may be words such as, but not limited to, an agent, a location, a topic, or about. "About" relationships indicate what the reporting act is referring to, or what it is about. At step 950, a semantic representation is generated that includes associations of identified elements described above. The semantic representation may then be stored in an index, such as semantic index 260 of FIG. 2.

Figure 10:
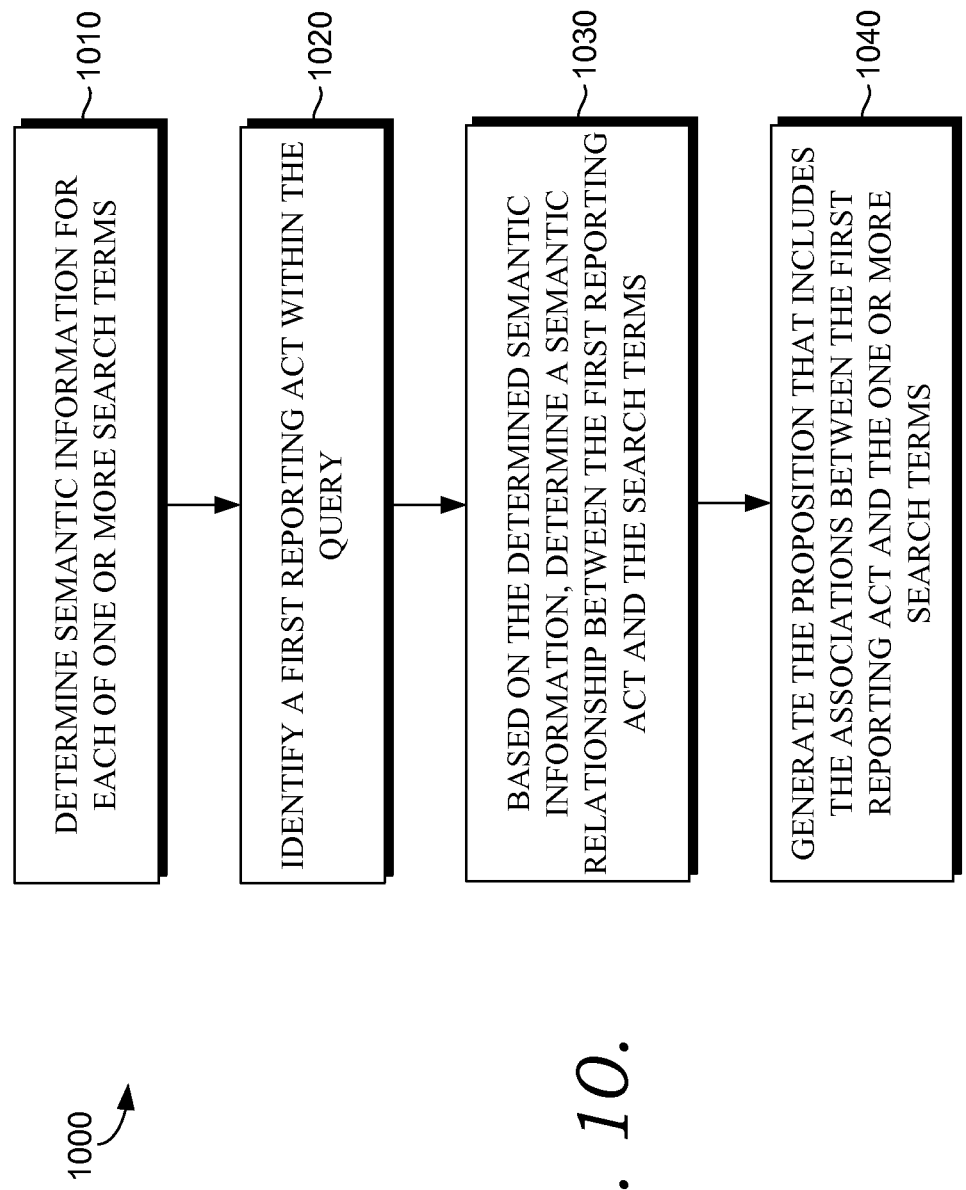
FIG. 10 is a flow diagram illustrating a method for, in response to receiving a query, creating associations between various terms distilled from the query to generate a proposition, in accordance with an embodiment of the present invention.

FIG. 10 shows a flow diagram 1000 that illustrates a method for, in response to receiving a query, creating associations between various terms distilled from the query to generate a proposition, the proposition being used to interrogate information stored in an index to provide relevant search results, in accordance with an embodiment of the present invention. A proposition is a logical representation of a conceptual meaning of the query that is used to interrogate semantic relationships contained within semantic representations of content from the documents. The process of generating a proposition from a query is very similar to the process described herein for generating a semantic representation of content of a document. Initially, a query is received as input from a user, and in one embodiment, the received query is parsed to determine one or more search terms within the query. Search terms are similar to elements identified in a text portion.

At step 1010, semantic information for each of one or more search terms is determined, and this semantic information may include one or more meanings and/or grammatical functions of the search terms therein. In addition to determining semantic information, a logical variable may be identified and may be associated with, or may even replace one or more of the search terms. A logical variable may be a number, letter, or a series or combination of both, and may represent a plurality of words having similar meanings to the search terms. This allows for a broadened, yet more relevant return of search results to the user. A first reporting act is identified within the query at step 1020. The reporting act may be a verb, noun, or any other part of speech, and may include an action, such as "say," "call," "denounce," "believe," etc. In one embodiment, more than one reporting act may be identified within a query, such as a second reporting act.

A semantic relationship may be determined between each reporting act and another search term to create an association between the words, and is shown at step 1030. Semantic relationships may be based on the determined semantic information, as described above. Associations are linked by relational elements, which describe the association, such as, but not limited to, agent, a location, a topic, or about. Other relational elements are certainly contemplated to be within the scope of the present invention. At step 1040, a proposition is generated that includes the formed associations between each reporting act and one or more of the search terms parsed from the query. Once the proposition is generated, the proposition (e.g., associations within the proposition) may be compared or matched against one or more semantic representations stored in semantic index 260, for example, to determine the most relevant matches for the proposition. In one embodiment, a query may contain more than one level of association, as described above, and thus a reporting act may be identified for each level of association.

Figure 11:
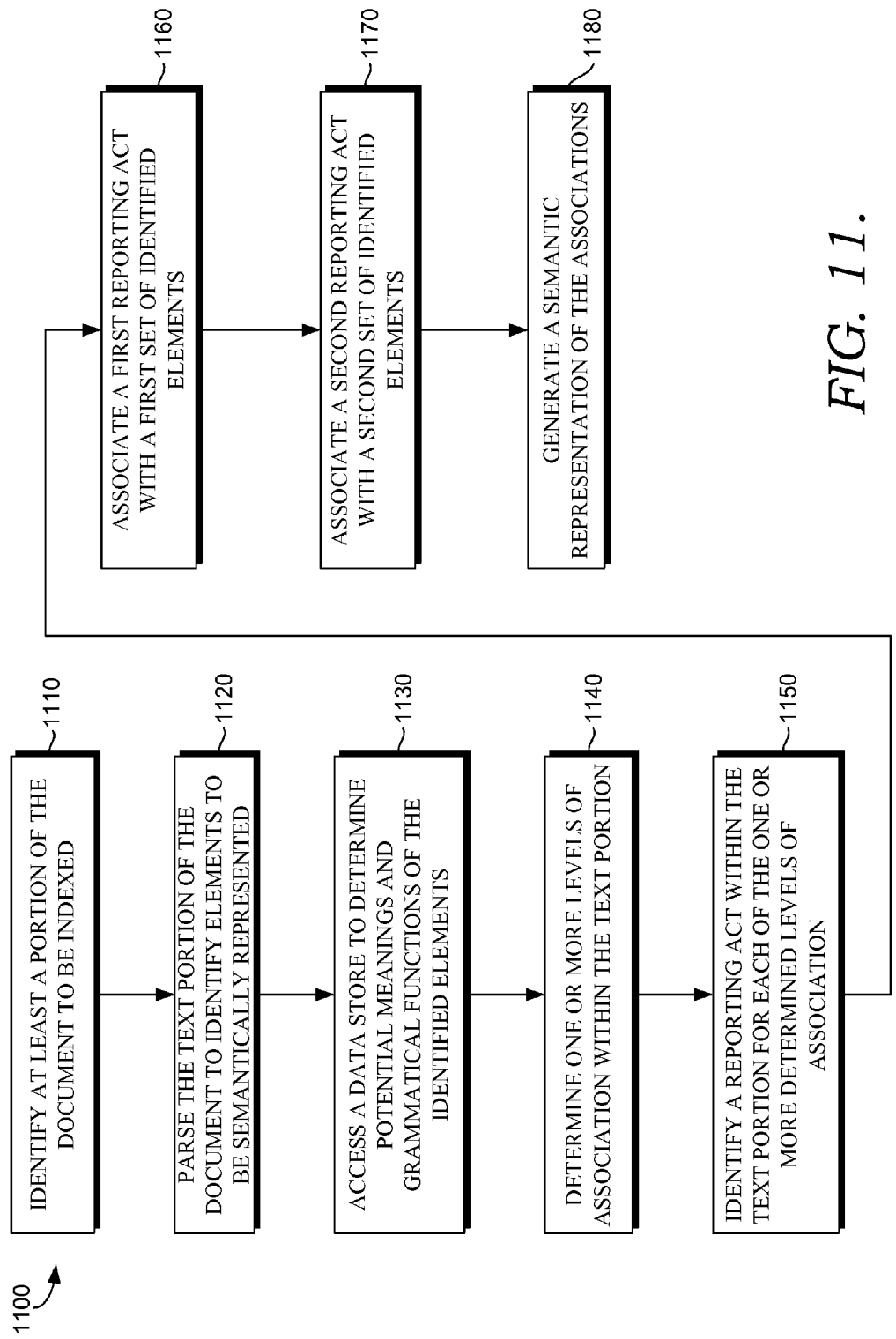
FIG. 11 is a flow diagram illustrating a method for developing semantic relationships between elements distilled from content of a document, in accordance with an embodiment of the present invention.

Turning to FIG. 11, a flow diagram 1100 illustrating a method for developing semantic relationships between elements distilled from content of a document to generate a semantic representation of the content, further allowing for indexing of the content, is shown, in accordance with an embodiment of the present invention. At step 1110, at least a portion of a document (e.g., web document) to be indexed is identified. The text portion of the document is parsed to identify elements that are to be semantically represented, shown at step 1120. At step 1130, a data store is accessed to determine potential meanings and grammatical functions of the identified elements.

With continued reference to FIG. 11, at step 1140, one or more levels of association within the text portion are determined. A reporting act within the text portion is identified for each of the one or more determined levels of association, shown at step 1150. Next, at step 1160, a first reporting act is associated with a first set of identified elements, which are determined by analyzing semantic relationships between the elements determined at step 1120 above and the determined reporting act. The first reporting act is associated with a first level of association. A second reporting act is associated with a second set of identified elements at step 1170, and the second reporting act is associated with a second level of association. A semantic representation of the associations may then be generated at step 1180 so that it may be stored in semantic index 260, for example, for further analysis, including a comparison to query propositions, as described above.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well-adapted to attain all the ends and objects set forth above, together with other advantages which are obvious and inherent to the methods. It will be understood that certain features and subcombinations are of utility and may be employed without reference to other features and subcombinations. This is contemplated by and is within the scope of the claims.

What is claimed is:

1. A computer-implemented method for developing semantic relationships between elements distilled from content of a document to generate a semantic representation of the content, the method comprising:
   identifying, by way of a computing device having a processor and memory, a text portion of the document;
   determining semantic information for a plurality of elements identified in the text portion, the semantic information including one or more of meanings of the identified elements or grammatical functions of the identified elements;
   identifying at least one of the identified elements as a subject of the text portion;
   determining a plurality of levels of association from the text portion and identifying at least one of the identified elements as a reporting act corresponding to an attitude report for each of the plurality of levels of association, the reporting act identified based on a set of rules that utilizes, in part, surrounding text, wherein the attitude report describes the subject's attitude toward a particular topic of the text portion;
   based on the determined semantic information for the identified elements, associating the identified elements so that each association of identified elements represents a certain semantic relationship;
   generating, by way of the computing device, a semantic representation that represents the associations, by way of relational elements that describe the associations, of the identified elements to one another; and
   indexing the semantic representation, including the identified elements and the relational elements, in an index for retrieval, the index being searchable and including pointers from the semantic representation to its associated text portion.

2. The method of claim 1, wherein the text portion comprises at least one of one or more sentences, a table, a template, or a plurality of data.

3. The method of claim 1, further comprising:
   accessing a data store to retrieve at least a portion of the content from the document.

4. The method of claim 1, further comprising:
   parsing the text portion of the document to identify the plurality of elements to be included in the semantic representation.

5. The method of claim 1, further comprising:
   recognizing one or more entities within the text portion, wherein the one or more entities are recognized by searching a predefined list of words stored in a data store.

6. The method of claim 1, further comprising:
associating with each of the identified elements a plurality of words having a similar meaning.

7. The method of claim 1, wherein associating the identified elements comprises identifying one or more levels of association within the text portion, each of the one or more levels of association including one or more of the identified elements.

8. The method of claim 7, further comprising:
identifying a reporting act for at least one of the one or more levels of association; and
associating a first reporting act with each of a first set of identified elements, wherein the first reporting act is associated with a first level of association.

9. The method of claim 8, further comprising:
associating a second reporting act with each of a second set of identified elements, wherein the second reporting act is associated with a second level of association.

10. The method of claim 8, wherein the first reporting act and each of the first set of identified elements are associated by way of a relational element that describes the association.

11. One or more computer storage media having computer-useable instructions embodied thereon for performing a method of developing semantic relationships between elements distilled from content of a document to generate a semantic representation of the content, further allowing for indexing of the content, the method comprising:
identifying at least a portion of the document to be indexed, the at least a portion of the document being a text portion;
parsing the text portion of the document to identify elements that are to be semantically represented;
accessing a data store to determine potential meanings and grammatical functions of the identified elements;
determining a plurality of levels of association within the text portion and identifying a reporting act for each of the plurality of levels of association, the reporting act identified based on a set of rules that utilizes, in part, surrounding text, wherein the plurality of levels of association comprise at least a first level of association and a second level of association such that a statement in the first level of association holds true regardless of the statement in the second level of association, and wherein the first level of association and the second level of association are associated with each other by way of the identified reporting act associated with the first level of association;
associating a first reporting act with a first set of identified elements, wherein the first reporting act is associated with a first level of association;
associating a second reporting act with a second set of identified elements, wherein the second reporting act is associated with a second level of association;
generating a semantic representation that includes associations, by way of relational elements that describe the associations, between the first set of identified elements to the first reporting act and the second set of identified elements to the second reporting act; and
indexing the semantic representation, including the identified elements and the relational elements, in an index for retrieval, the index being searchable and including pointers from the semantic representation to its associated text portion.

12. One or more computer storage media having computer-useable instructions embodied thereon for performing a method of developing semantic relationships between elements distilled from content of a document to generate a semantic representation of the content, further allowing for indexing of the content, the method comprising:
identifying a text portion of the document to be indexed;
determining semantic information for a plurality of elements identified in the text portion, the semantic information including one or more of meanings of the identified elements or grammatical functions of the identified elements;
determining a plurality of levels of association within the text portion and identifying a reporting act within the text portion for each of the plurality of levels of association, the reporting act identified based on a set of rules that utilizes, in part, surrounding text, wherein the plurality of levels of association comprise at least a first level of association and a second level of association such that a statement in the first level of association holds true regardless of the statement in the second level of association, and wherein the first level of association and the second level of association are associated with each other by way of the identified reporting act associated with the first level of association;
for the identified reporting act in each of the plurality of levels of association, identifying one or more about relationships between the reporting act and one or more of the identified elements in the text portion;
associating each of the identified reporting acts with the one or more identified elements to form the about relationships, wherein the one or more identified elements describe what each respective reporting act is about;
generating a semantic representation that represents the associations, by way of relational elements that describe the associations, of the reporting acts and the identified elements to one another; and
indexing the semantic representation, including the identified elements and the relational elements, in an index for retrieval, the index being searchable and including pointers from the semantic representation to its associated text portion.

* * * * *